United States Patent
Campfield

(10) Patent No.: US 9,758,204 B2
(45) Date of Patent: Sep. 12, 2017

(54) MOTORCYCLE OPERATOR ENDURANCE SEAT OFF ROAD

(71) Applicant: Mark Allen Campfield, Snohomish, WA (US)

(72) Inventor: Mark Allen Campfield, Snohomish, WA (US)

(*) Notice: Subject to any disclaimer, the term of this patent is extended or adjusted under 35 U.S.C. 154(b) by 204 days.

(21) Appl. No.: 14/819,433

(22) Filed: Aug. 6, 2015

(65) Prior Publication Data

US 2017/0036725 A1    Feb. 9, 2017

(51) Int. Cl.
*B62J 1/12* (2006.01)
*B62J 1/22* (2006.01)
*B62J 1/20* (2006.01)
*B62J 1/26* (2006.01)

(52) U.S. Cl.
CPC . *B62J 1/22* (2013.01); *B62J 1/12* (2013.01); *B62J 1/20* (2013.01); *B62J 1/26* (2013.01)

(58) Field of Classification Search
CPC .......................................................... B62J 1/22
USPC .................................. 297/195.1, 197, 219.12
See application file for complete search history.

(56) References Cited

U.S. PATENT DOCUMENTS

| | | | | |
|---|---|---|---|---|
| 5,697,671 A | * | 12/1997 | Shavitz ................... | B62J 1/22 297/214 |
| D412,867 S | * | 8/1999 | White ..................... | D12/114 |
| D494,128 S | * | 8/2004 | Berger .................... | D12/416 |
| 6,971,715 B2 | * | 12/2005 | Hankins .................. | B62J 1/22 280/304.4 |
| 8,342,278 B2 | * | 1/2013 | Oohashi ................. | B60R 16/04 180/68.5 |
| 2002/0069464 A1 | * | 6/2002 | Welsh .................... | B62J 1/20 5/653 |

* cited by examiner

*Primary Examiner* — Sarah McPartlin

(57) ABSTRACT

The Motorcycle Operator Endurance Seat-Off Road (MOE-SOF) is a layered mesh like structure of straps that when installed over an existing off road motorcycle style seat provides additional width to better support a seated rider. The straps are spaced apart and attached together only at the points the straps cross each other. The middle layer of straps is sewn into loops that capture and hold two structural foam seating components, one each on the left and right. These cylinders are suspended alongside the sides of an existing motorcycle seat, the top of the cylinders roughly parallel to the top of the existing seat. When a load is applied by a seated rider the straps firm up under tension caused by the foam wanting to deform under compression. When not under load the structure articulates in place, deflecting out of the way from horizontal rider contact, returning when contact ends.

2 Claims, 29 Drawing Sheets

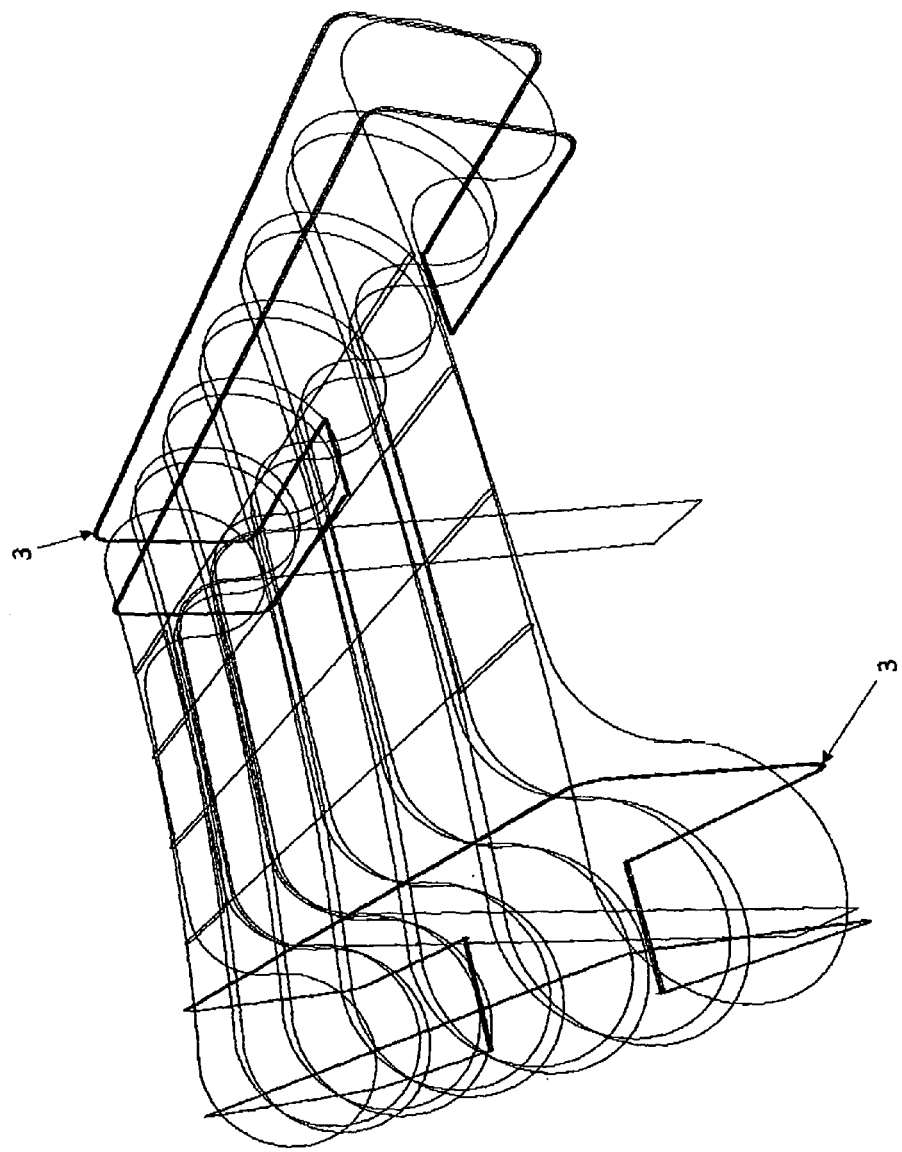

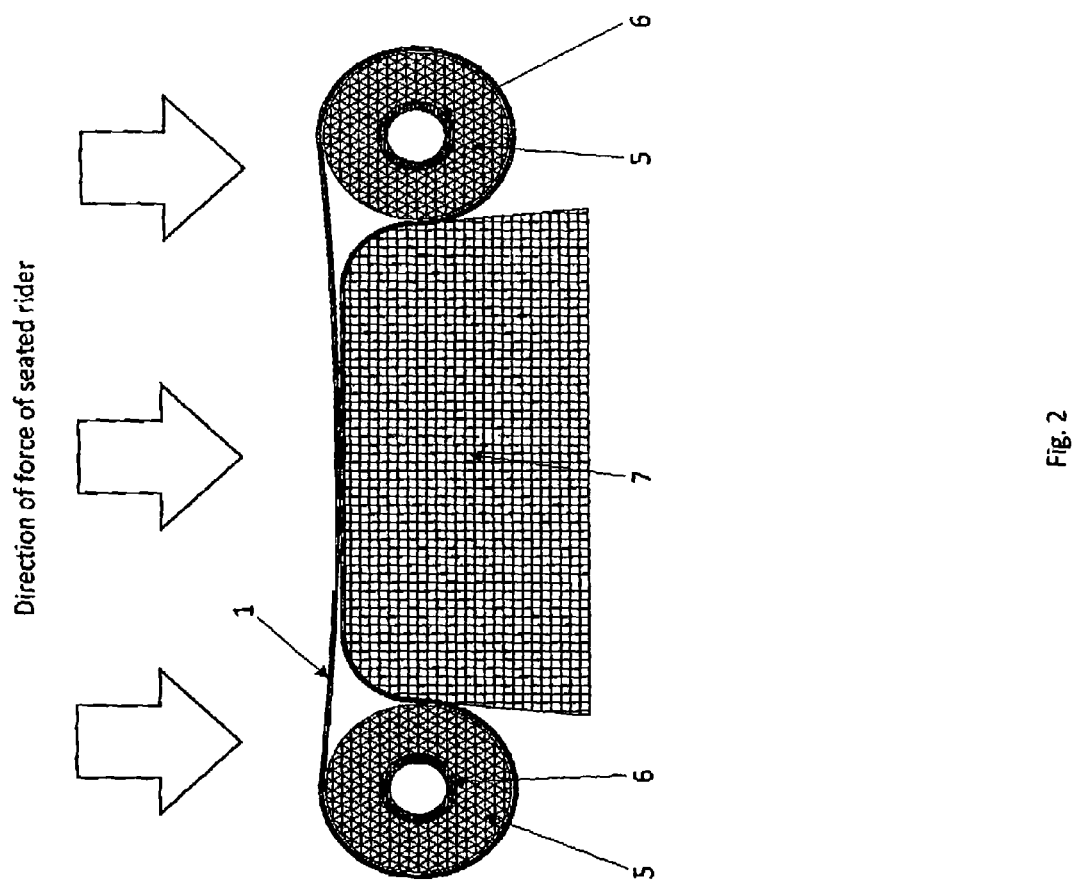

MOTORCYCLE OPERATOR ENDURANCE SEAT OFF ROAD

CROSS REFERENCES

N/A

FEDERALLY SPONSORED

N/A

SEQUENCE LISTING

N/A

BACKGROUND/CONTEXT OF INVENTION

Among other things, skeletal structures in human beings support the weight of an individual, active or resting. When a person is seated on a surface wide enough to support them, the left and right ischium components of their pelvis are the parts of the skeletal structure designed to transfer the load (weight) of their upper body to the surface they are seated on.

Motorcycle seats are purpose built. They allow for maximum rider agility while riding.

These seats can be forced up in between the ischium structures of the pelvis of some seated riders. When seated, these people now have only soft tissue supporting any weight not supported by their hands or feet. This quickly leads to discomfort as the muscles, organs, and vascular structures normally protected by the bones of the pelvis are asked to do something they are not designed to do, compress to support loads.

SUMMARY

In form, the MOESOF seat is a 3 layered, articulating "webbing" like structure 1, 2, 3 (FIG. 1A) that adds foam seating material 5 (FIG. 1F) to a motorcycle seat 7 (FIG. 1G) and increases the useable seating area under a rider (FIG. 2).

The middle layer is the main load bearing structure of the MOESOF seat, and is made up of straps 1 (FIG. 4) arranged into loops 1 (FIG. 7). These loops are themselves each sewn together in their center 1, and 8 (FIG. 7) to make a dual loop structure similar in configuration to a "figure 8" 1 (FIG. 1B). They run from side to side across an existing motorcycle seat 7 (FIG. 10) and are designed to hold additional foam components 5 and 6 (FIG. 10) parallel to each side of the existing seat 5 and 6 (FIG. 1F). These loops capture and retain the additional seating material needed to widen the existing seat surface (FIG. 2).

The top layer consists of four straps, two inner straps 2 (FIG. 2C) and two outer straps 3 (FIG. 1D). They run front to rear and lay over the top of the loops of the middle layer 2 and 3 (FIG. 1A). The loops are not stitched closed by the attachment of the top straps, rather each loop is expanded and the top straps attach only to the upper strap of the loops they are in immediate contact with 1, 2, and 8 (FIG. 12). The inner and outer straps tie the loops of the middle layer together, holding them in place relative to each other (FIGS. 1C and 1D).

The bottom layer provides the connection between the bike and the MOESOF seat 4 (FIG. 22). It is the structure that is used to anchor the MOESOF seat to the motorcycle. A single strap is used as an anchor strap 4 (FIG. 1E). Each end of the anchor strap is affixed to the bike, and the center of the strap is affixed to a small area on the bottom of the MOESOF seat 4 and 8 (FIG. 21).

The final components of the MOESOF seat are two structures made of foam suitable for a seat 5 (FIG. 14). Each of these has a rigid tube at its core to ensure the foam components has structure to it and will not bend under load 6 (FIG. 14). The structural foam components are captured by the loops of the middle layer and are suspended in place alongside the top of the existing motorcycle seat, one each on the left and right (FIG. 1G).

As designed and built there are short runs of strap free of any attachment points running between every point on the MOESOF seat where one strap is connected to another. Additionally, the foam components of the seat are merely caged in the loops and straps, they are not physically attached to any strap or component, but rather allowed to float in the pocket designed to contain them.

In function, three behaviors combine to make up the MOESOF seat's functionality. First and foremost, it responds to the vertical load of a seated rider by firming up into a wider structural seat (FIG. 2). Second, when unloaded by a rider standing on the bike's foot pegs, the MOESOF seat relaxes and as the rider's legs straighten out and their knees move from the front of the bike towards the center of the bike, the MOESOF seat structure will distort in an organized way, deflecting the MOESOF seat foam components to the rear and up out of the way. And third, the entire MOESOF seat structure absorbs the force deflecting it, distributing and storing that force in every length of strap that runs between points where the straps are connected to one another. These many points of distortion or deflection across many short lengths of strap exploit the phenomenon of plastic deformation and the moment the deflecting force is removed the MOESOF seat frame will spring back to its original installed state and return the additional foam components to their position under the rider.

The MOESOF seat's 3-layer design, the materials it's made with, and its web or net like form when assembled, all combine to provide these characteristics and give the MOESOF seat the high elevated level of utility that it has.

Figure 1A:
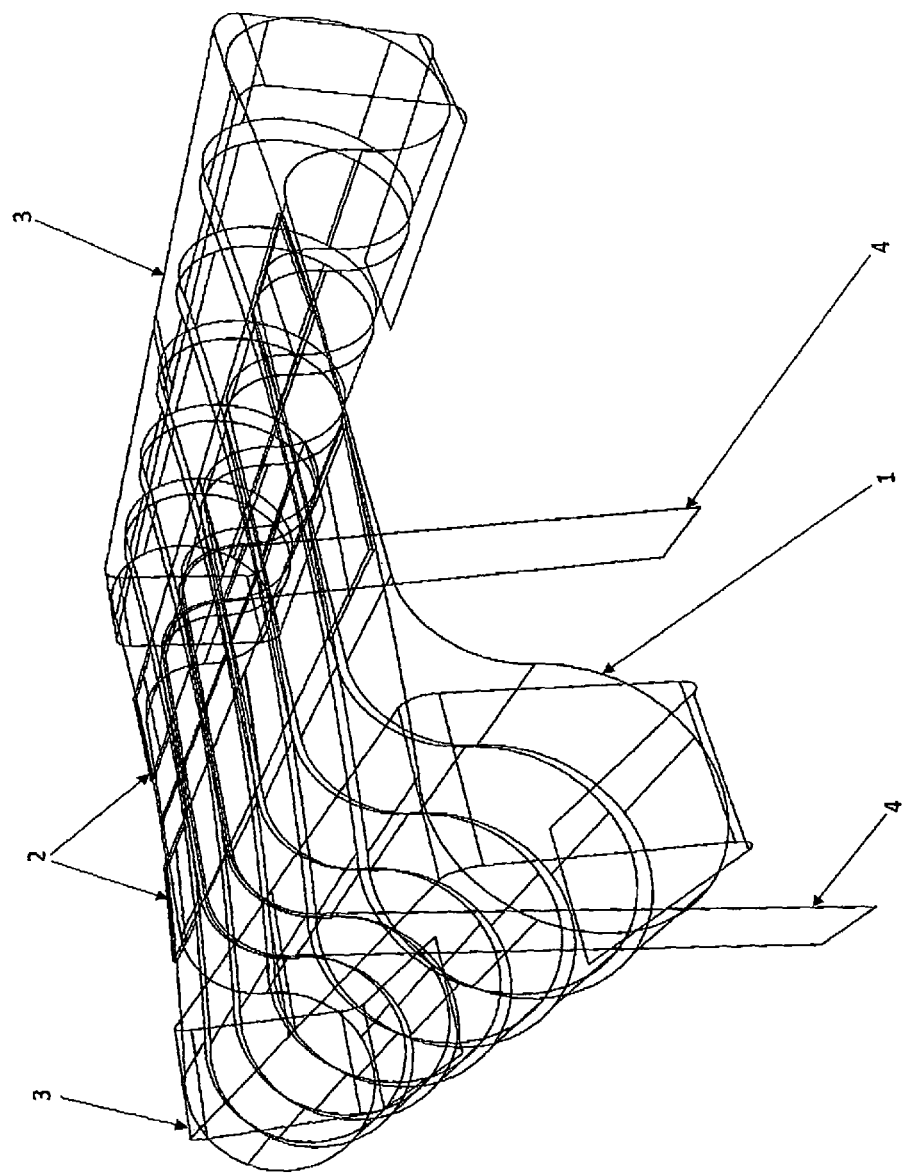
FIG. 1A_moesof_seat_frame
Figure 1B:
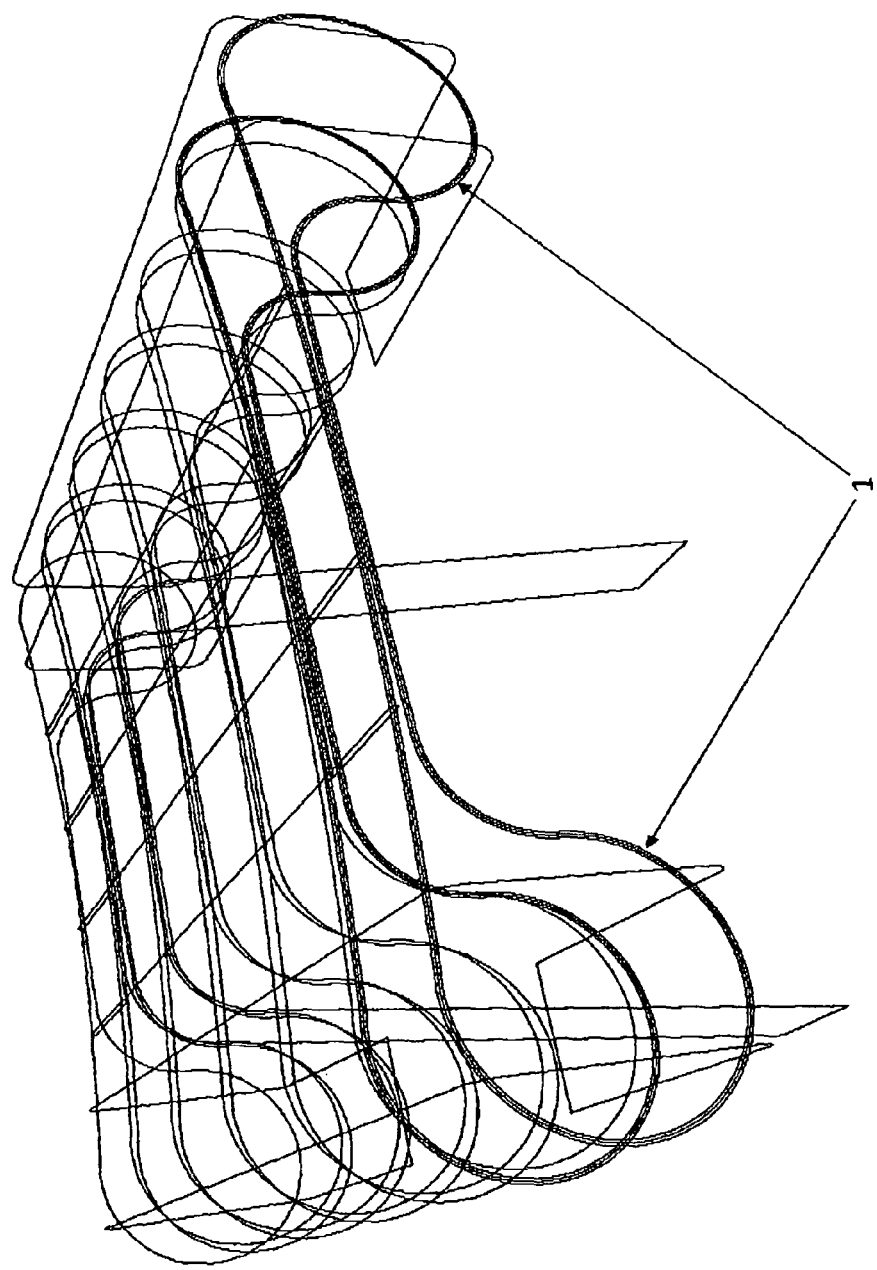
Figure 1C:
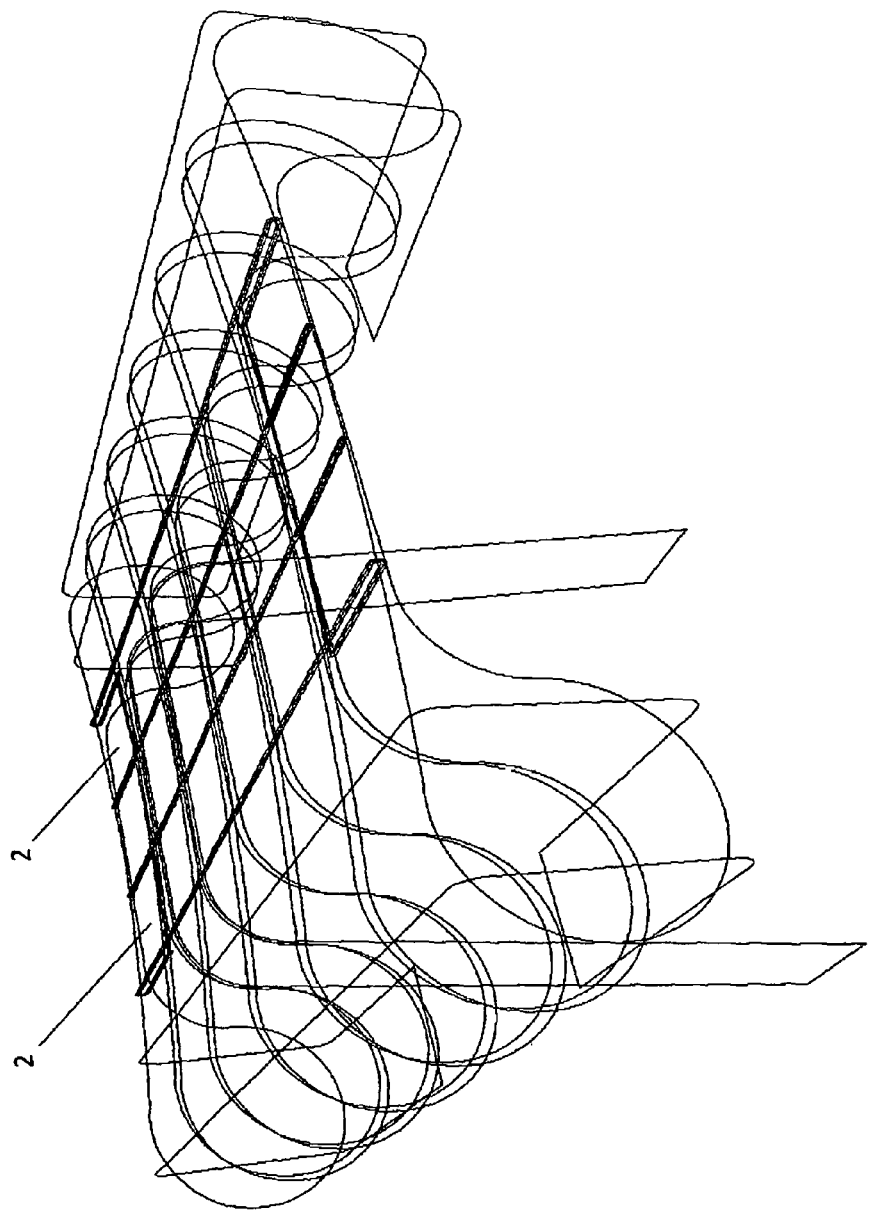

Rendered drawing illustrating all the major components of the MOESOF seat frame as they appear when assembled into a completed seat (1 is dual loop strap, 2 is inner strap, 3 is outer strap, 4 is anchor strap)—view is from above rear left perspective, shows the shape the MOESOF seat frame takes when it is draped over the top of an existing motorcycle seat, as the seat would occupy the recess that extends up and into the centerline of the seat between the left and right edges of the seat FIG. 1B_moesof_seat_dual_loops Wireframe drawing illustrating all the components of the MOESOF seat frame as they appear when assembled into a completed seat—view is from above rear left perspective, highlighting one of the dual loop straps 1 by drawing it with bold lines, showing what a dual loop strap is and showing how the left and right ends of the loops are expanded to occupy the area on either side of a motorcycle seat, how the top and bottom of the dual loop straps rest on top of each other when passing over the top surface of the existing motorcycle seat, how the dual loop straps are located in the assembled seat frame, and what and where they contacts the other components of the seat, FIG. 1C_moesof_seat_inner_straps Wireframe drawing illustrating all the components of the MOESOF seat frame as they appear when assembled into a completed seat view is from above rear left perspective, highlighting both the left and right inner straps 2 by drawing them with bold lines, showing what an inner strap is and how it fits in the assembled seat frame, what and where it contacts other components of the seat. Note how each top strap is only contacting the top strap of each of the dual loop straps.

FIG. 1D_moesof_seat_outer_straps

Wireframe drawing illustrating all the components of the MOESOF seat frame as they appear when assembled into a completed seat—view is from above rear left perspective, highlighting both the left and right outer straps 3 by drawing them with bold lines, showing what an outer strap is, how it fits in the assembled seat frame, and where it contacts other components of the seat. Note how each end travels out and around and under the dual loop straps.

Figure 1E:
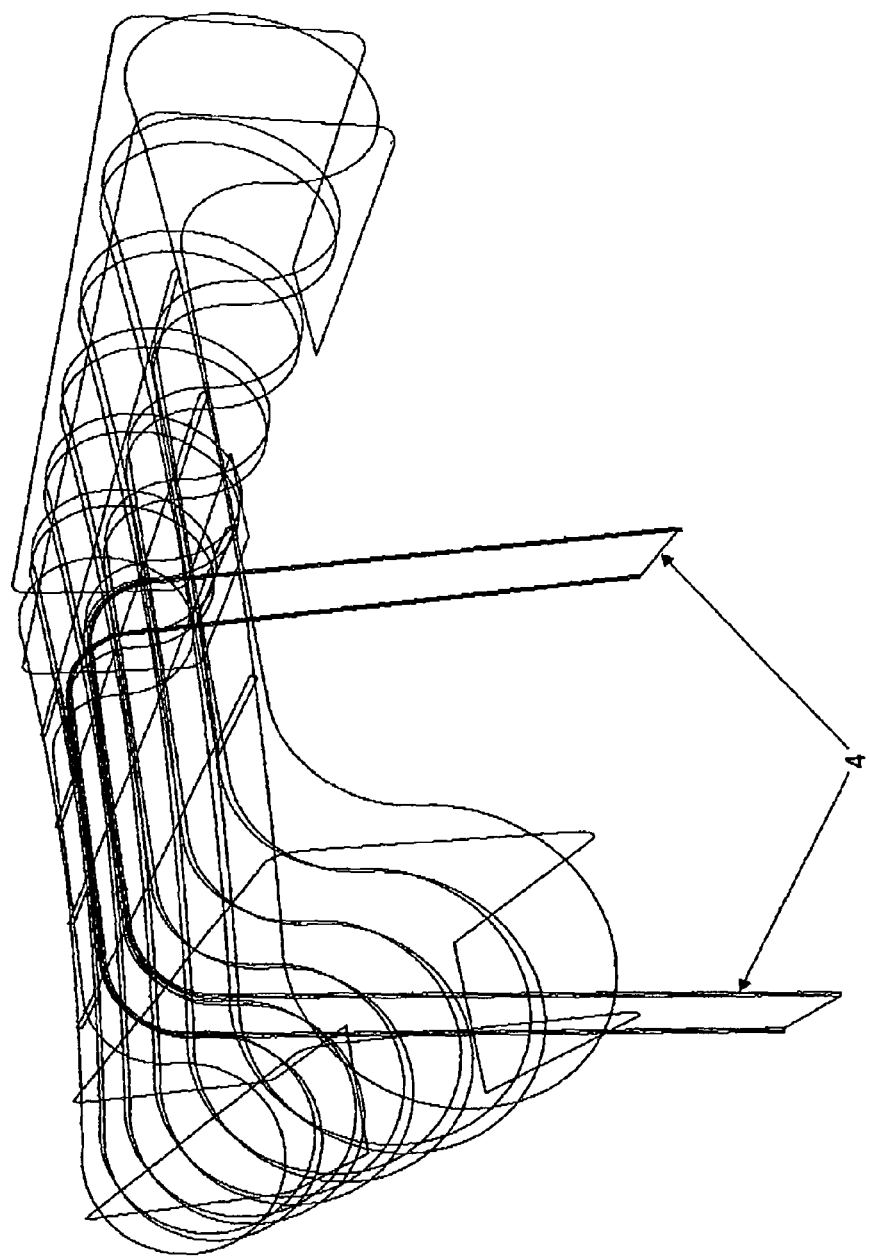

FIG. 1E_moesof_seat_anchor_straps

Wireframe drawing illustrating all the components of the MOESOF seat frame as they appear when assembled into a completed seat view is from above rear left perspective, highlighting the anchor strap 4 by drawing it with bold lines, showing what an anchor strap is and how it fits in the assembled seat frame, what and where it contacts other components of the seat. Note how the anchor strap contacts only bottom strap of a dual loop strap 2, and bow long tails extend down from seat frame to be positioned over side covers of motorcycle when MOESOF seat is installed onto motorcycle.

Figure 1F:
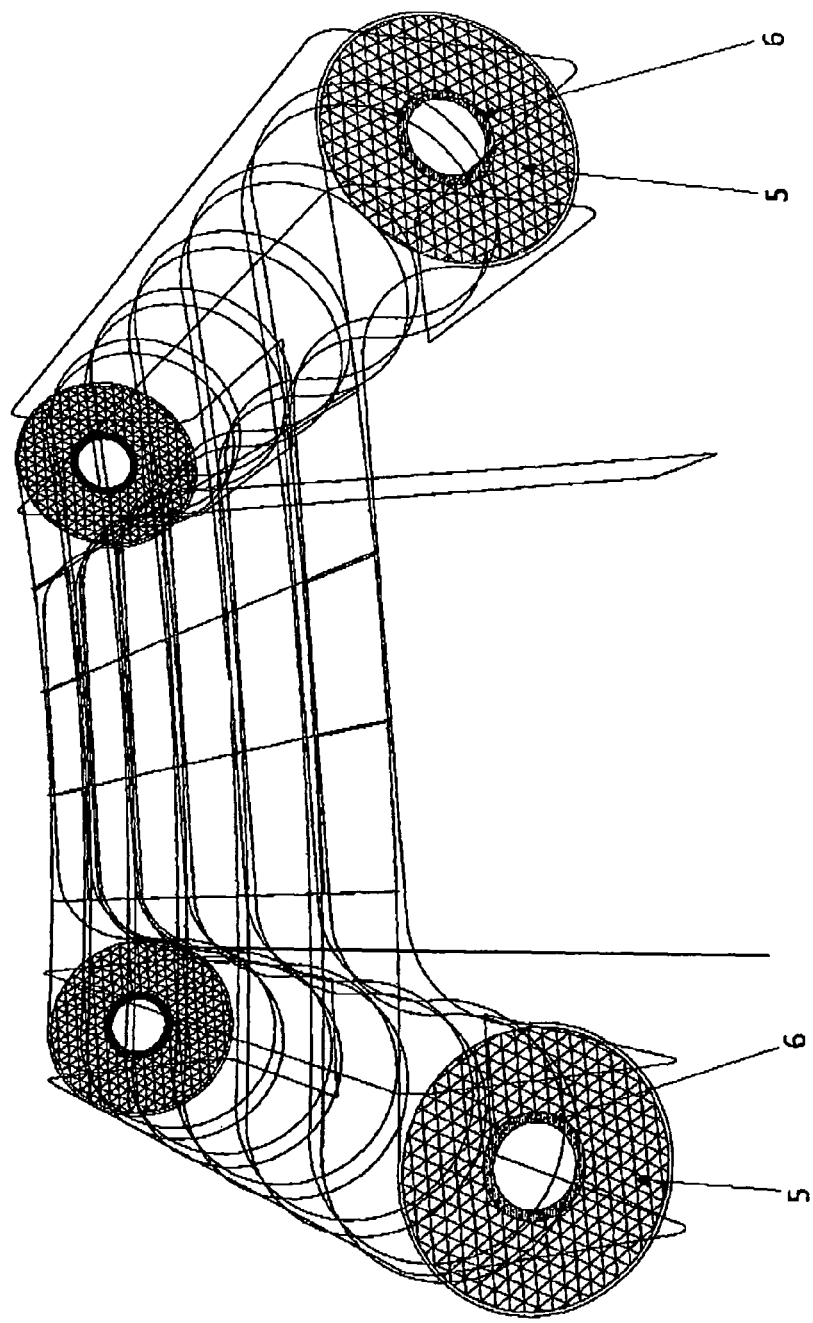

FIG. 1F_moesof_seat_cylinders

Wireframe drawing illustrating all the components of the MOESOF seat frame as they appear when assembled into a completed seat view is from above rear and slightly left of center perspective, highlighting the two structural foam components 5 and the rigid tube or rod running down the center of the foam 6 by illustrating with bold lines the front and rear disks of each and rigid tube or rod, showing what a structural foam component is and how it is located in the assembled seat frame, and what and where it contacts other components of the seat. Note how this view shows components as they appear when the MOESOF seat is draped over the top of an existing motorcycle seat represented by the recess in the bottom of the seat frame.

Figure 1G:
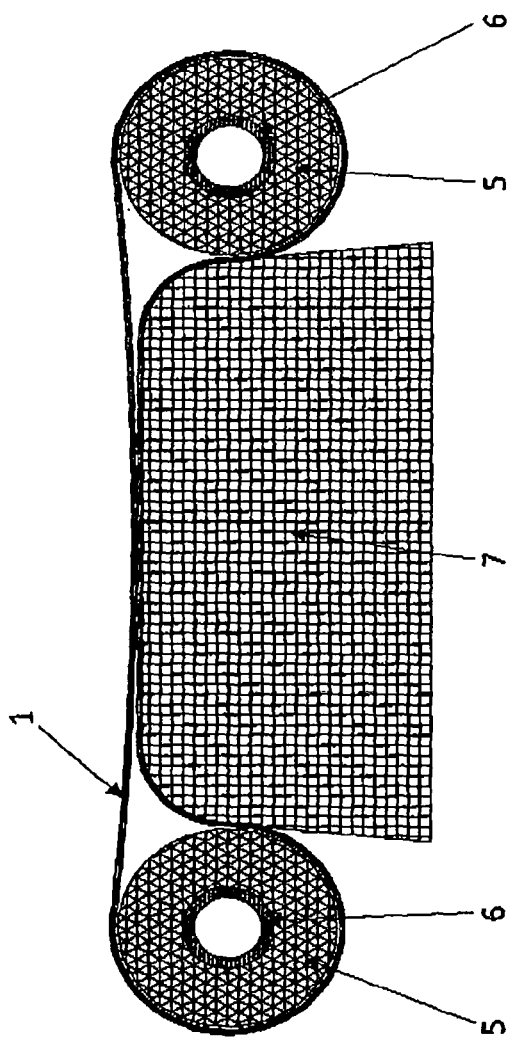

FIG. 1G_moesof_seat_cross_section

Figure 3:
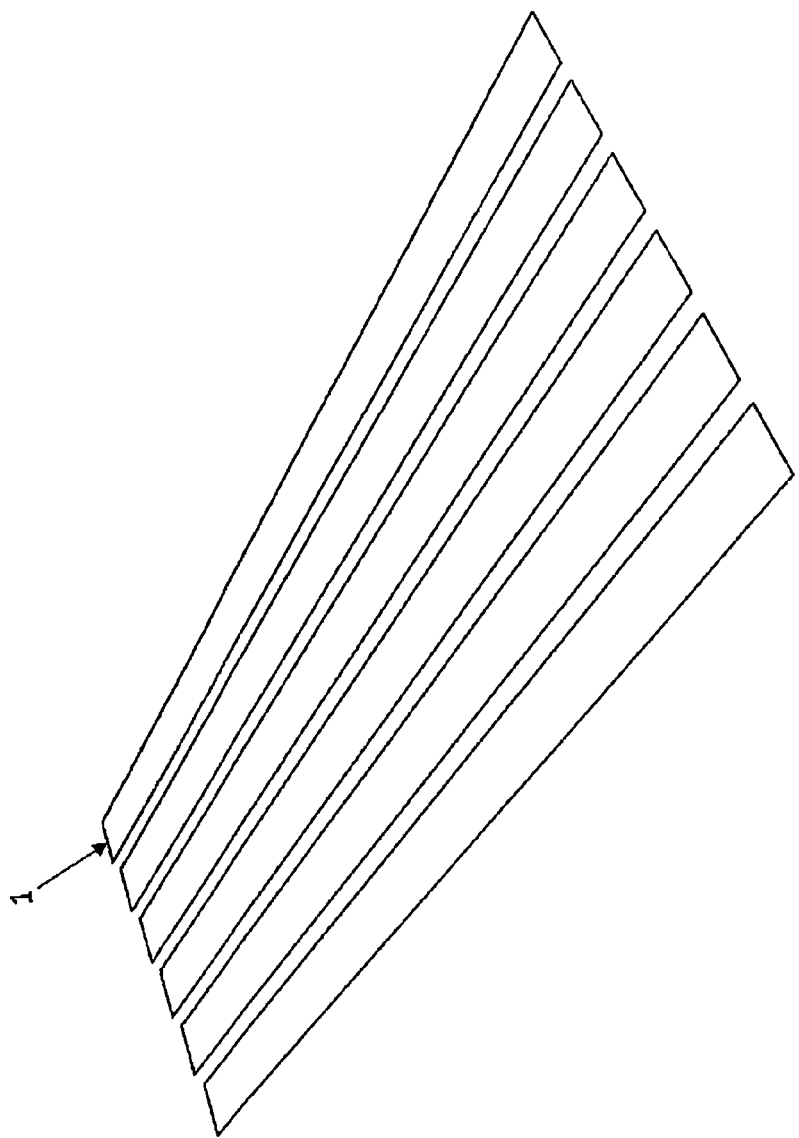

Drawing showing the load bearing structural components of the MOESOF seat as they appear when assembled and installed on an existing motorcycle seat 7. Note how the MOESOF seat frame and structural foam components drape over the existing seat and how the shape the existing seat dictates the form of the MOESOF seat frame and the location of structural foam components along the side of the existing seat, FIG. 2_moesof_seat_load_path Drawing showing the load bearing structural components of the MOESOF seat 1, 5, and 6 as they appear when assembled and installed on an existing motorcycle seat 7 and how they react to vertical loads. The center of the MOESOF seat is supported from below by the existing off-road style motorcycle seat 7, while the structural foam components 5 are not supported from below but are instead supported by the dual loop straps 1 and the sides of the existing off-road style motorcycle seat 7. Note the rigid tube 6 located in the center of the foam component 5 to give the foam component 5 rigidity front to back to distribute vertical loads across all dual loop straps 1, note how the bottom strap of the dual loop straps 1 is longer to wrap around the bottom of the foam components 5 and back up and over the top of the existing motorcycle seat 7 to contact both the top and the sides of the existing motorcycle seat 7. When the load of a seated rider is applied this configuration causes the structural foam components 5 on either side of the existing seat to want to roll inwards and clamp down around the supported center of the MOESOF seat, compressing the structural foam components 5 into the sides of the existing seat. This creates tension in the dual loop straps 1 compresses the structural foam components 5 as well as the top and sides of the existing motorcycle seat 7, creating the rigid MOESOF seat structure of greater volume and width, FIG. 3_moesof_seat_starter_strap Drawing showing what starter straps look like prior to beginning the process of joining each individually into dual loop straps 1. Note each strap is longer than the last, this creates loop structures that graduate in length so that when assembled and installed they can fit any taper front to back of a motorcycle seat.

Figure 4:
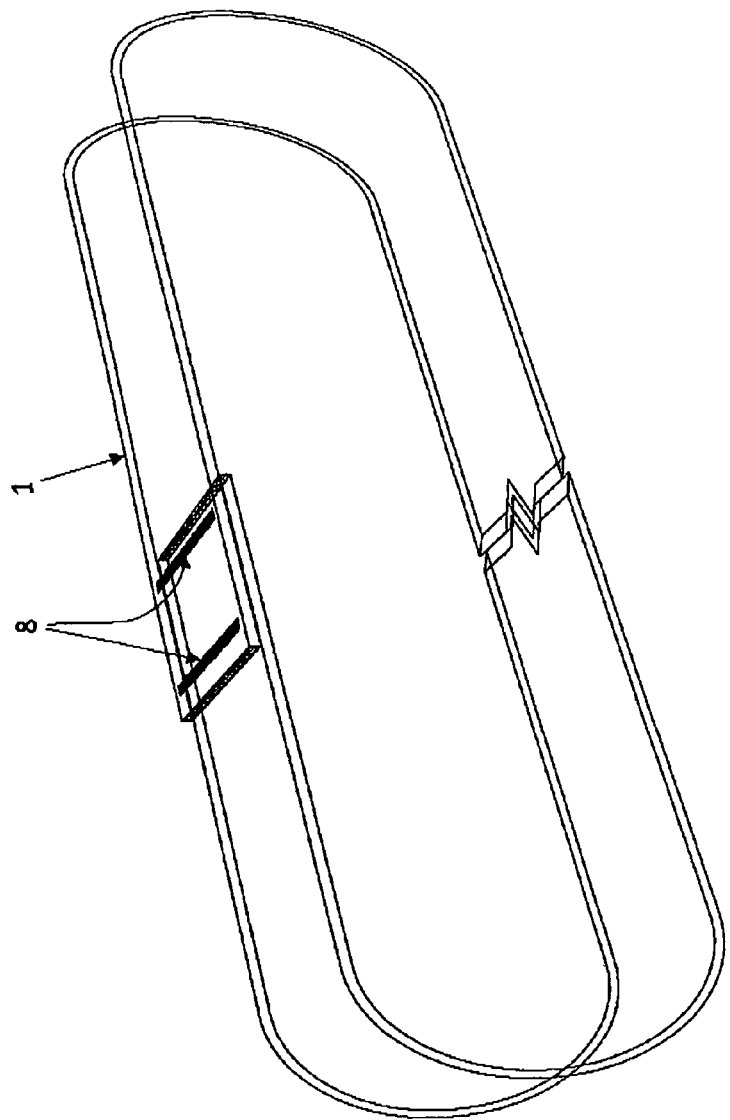
Figure 5:
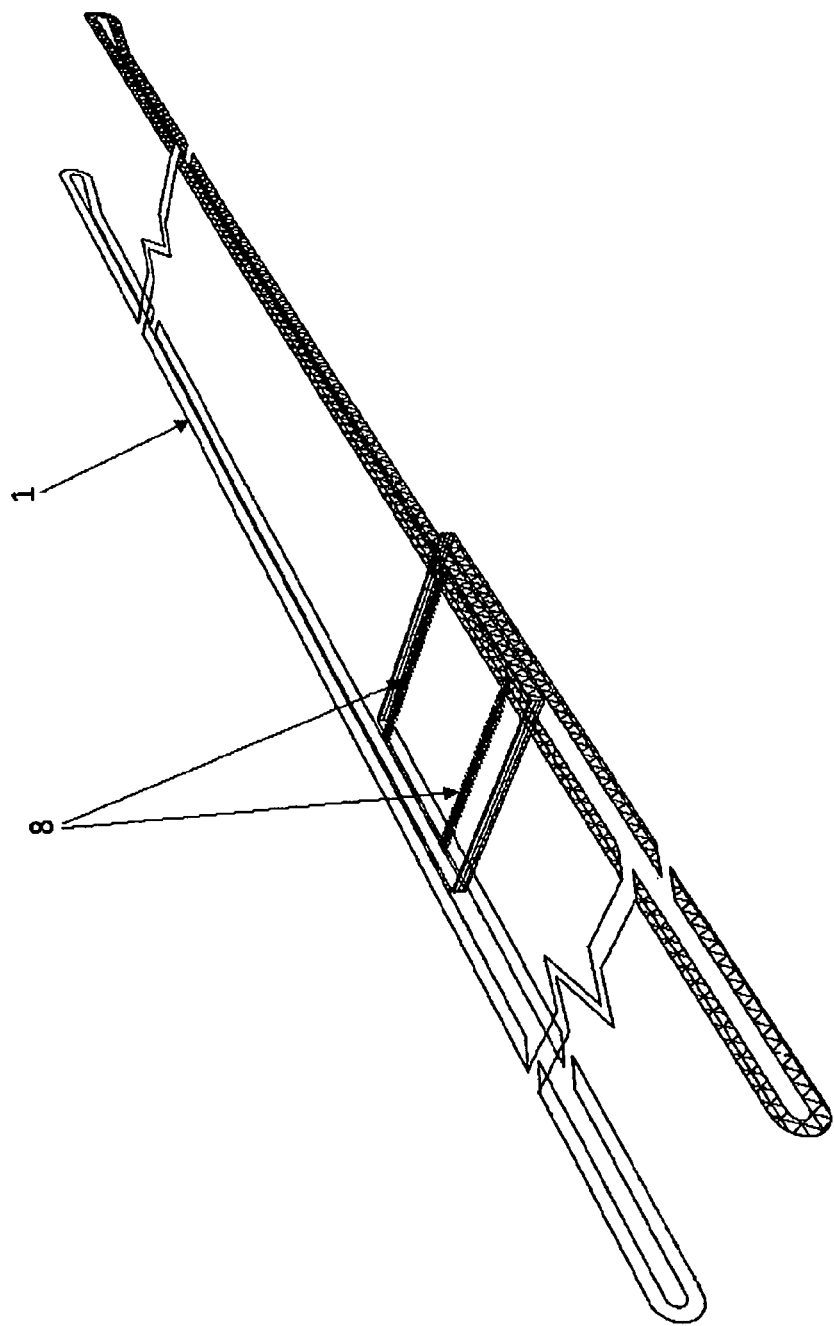

FIG. 4_moesof_seat_strap_join

Drawing showing the method of joining a starter strap into a large loop with stitching S prior to beginning the process of joining this large loop into a dual loop strap 1.

Figure 6:
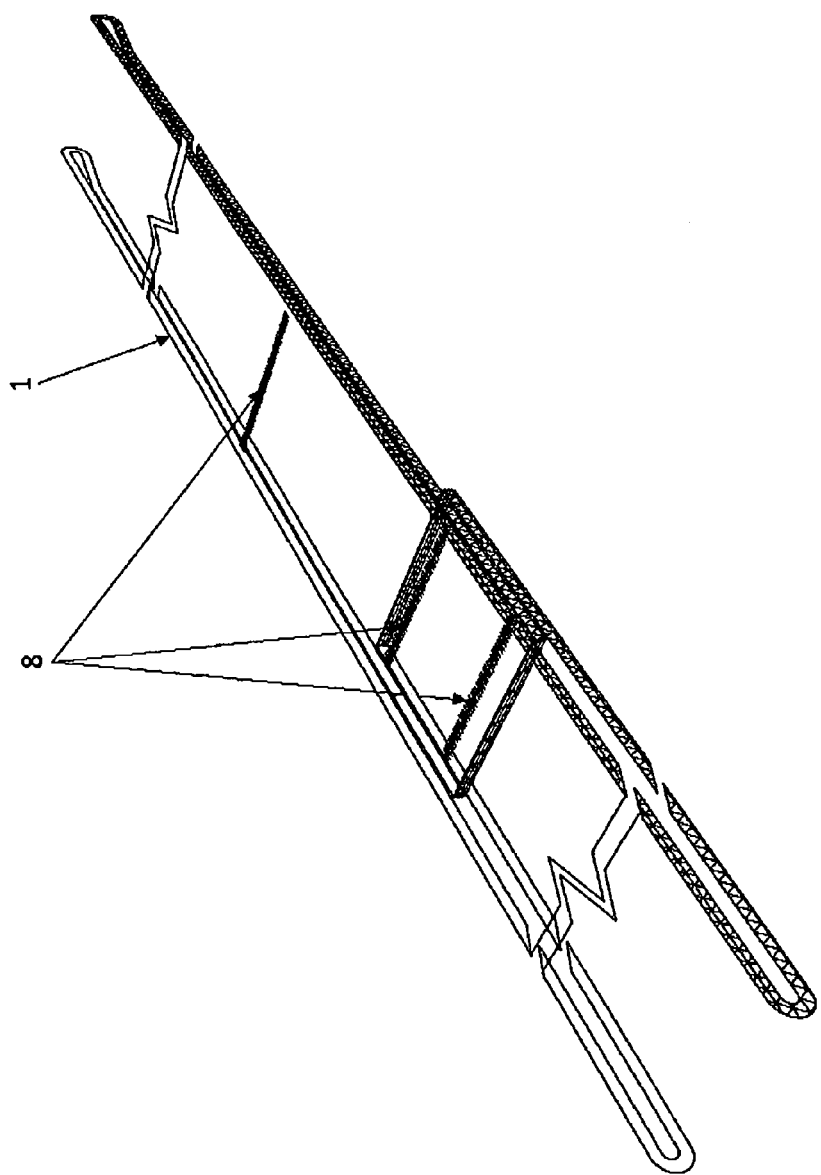

FIG. 6_moesof_seat_loop_layout

Drawing showing the intended layout of a single large loop prior to beginning sewing each large loop into a dual loop strap 1. Note the large loop 1 is collapsed and laid flat with the overlapped joint from FIG. 4_moesof_seat_strap_join arranged on the bottom, and the continuous run of unbroken strap is arranged on top.

FIG. 6_moesof_seat_loop_stitch

Drawing showing the location of the stitching on the flat large loop to join it into a MOESOF seat dual loop strap 1 structure.

Figure 7:
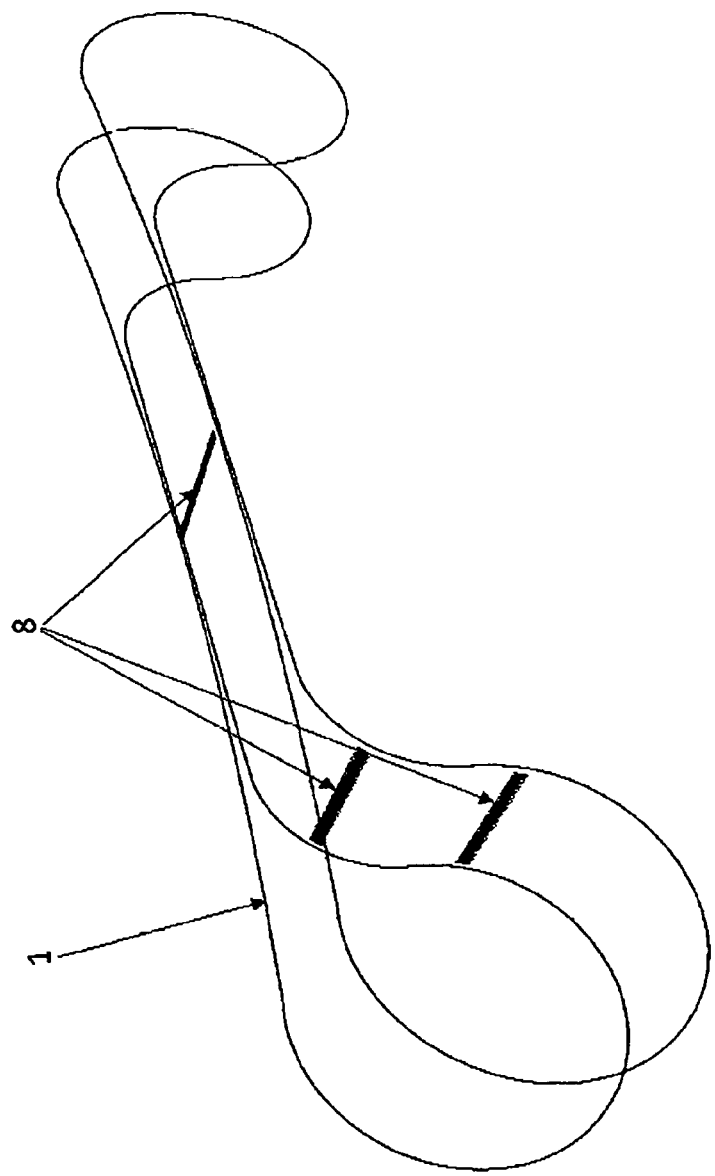

FIG. 7 moesof_seat_dual_loop

Wireframe drawing of a single MOESOF seat dual loop 1 structure laid out as it would appear when part of an assembled MOESOF seat.

Figure 8:
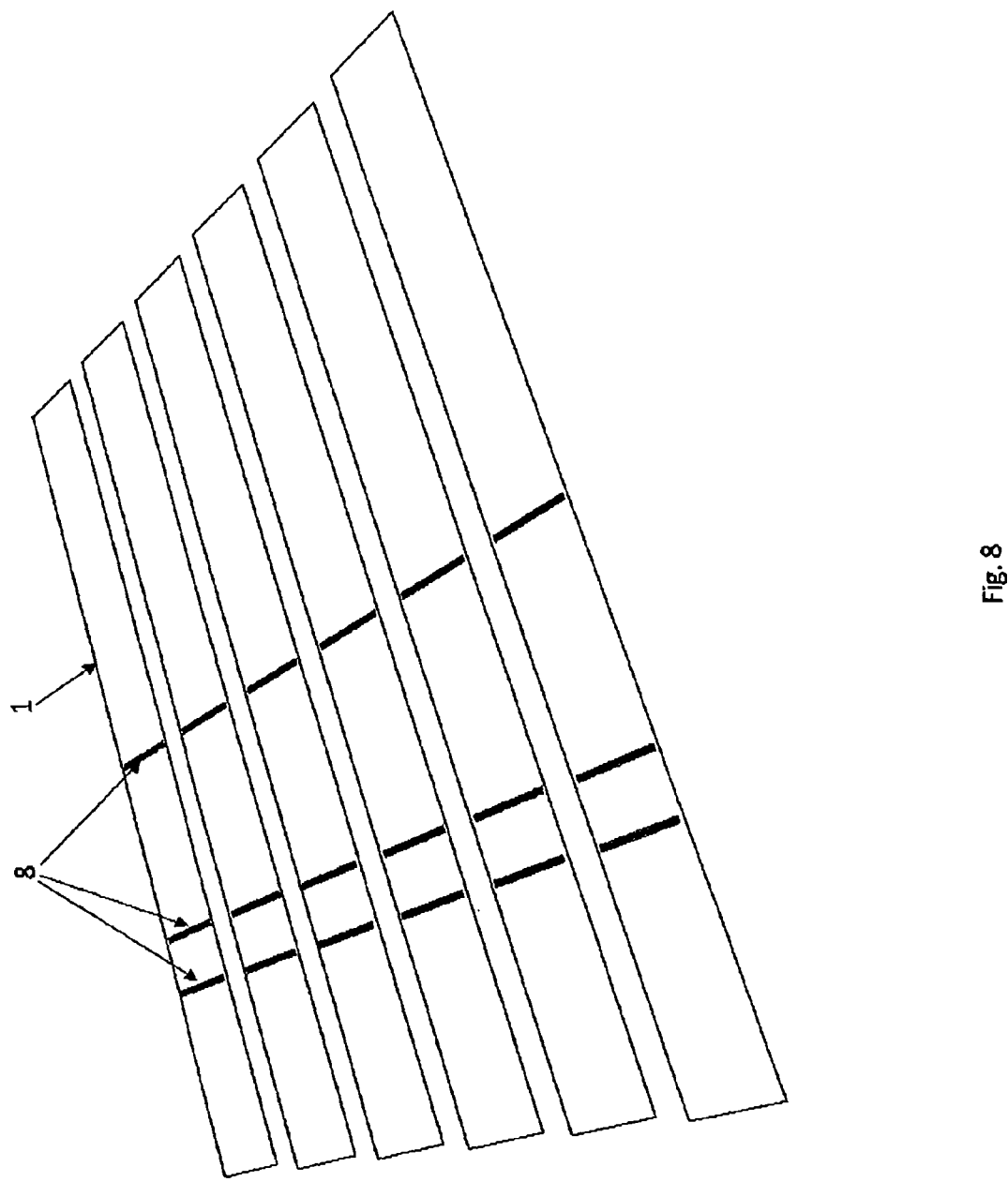

FIG. 8_moesof_seat_dual_loop_layout

Drawing showing MOESOF seat dual loop straps 1 laid out as they would be prior to joining them using the inner and outer straps. Note that the straps are arranged from smallest to largest.

Figure 9:
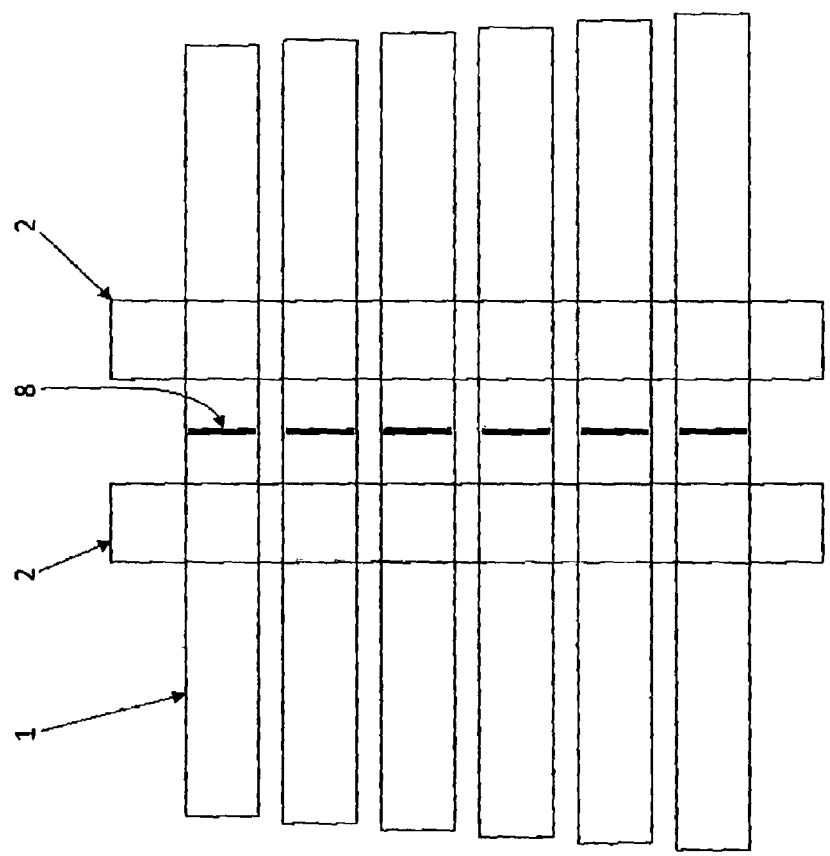

FIG. 9_moesof_seat_inner_strap_layout

Drawing showing both inner straps 2 laid out properly across dual loop straps prior to fastening the inner straps 2 to the top strap of the dual loop straps. Note the extra length of the inner strap 2 hanging equally over the ends of the dual loop straps 1.

Figure 10:
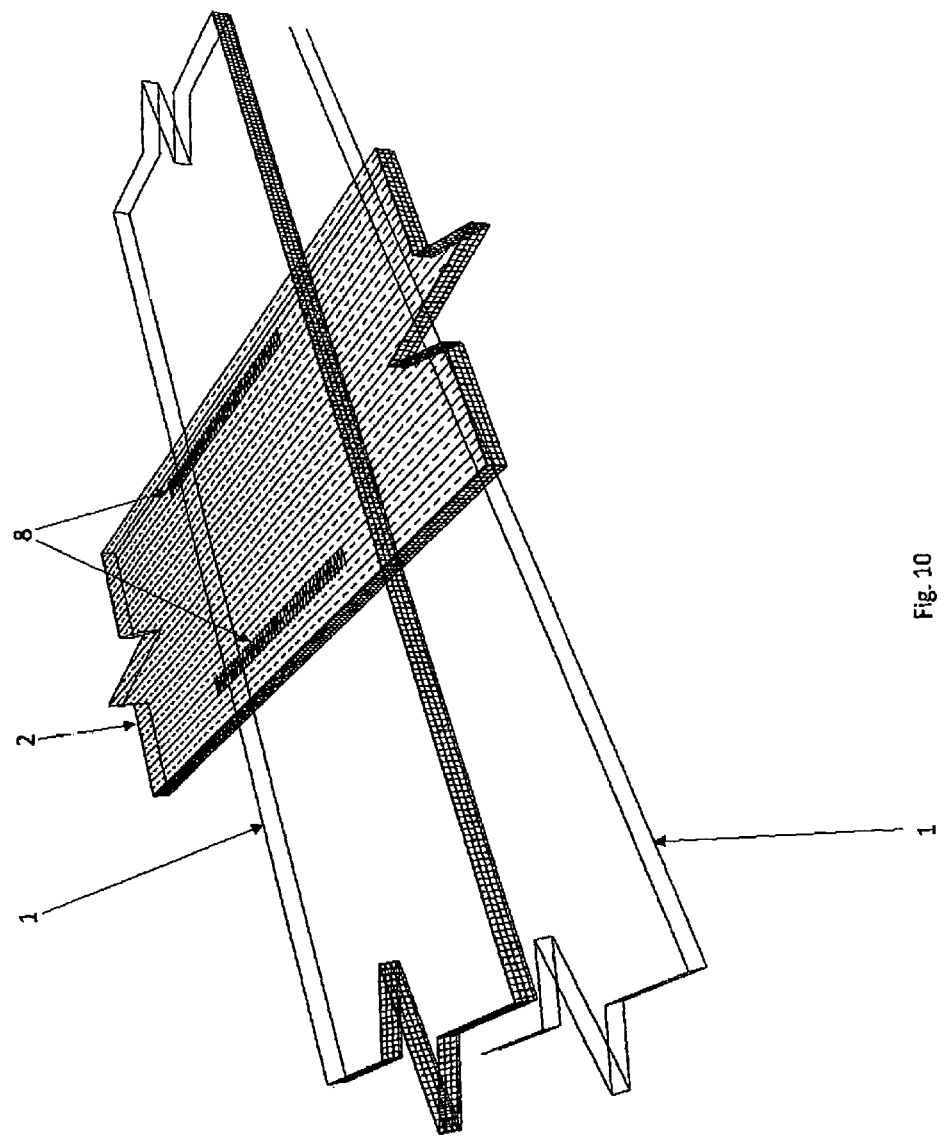

FIG. 10_moesof_seat_inner_strap_sew_detail

Detail drawing of one of the eight areas where an inner strap 2 is joined with the top strap of a dual loop strap 1. Note that the top strap and the bottom strap of the MOESOF seat dual loop strap 1 are deliberately separated in this view showing that the inner strap 2 is only in contact with, and only attached to, the top strap of the dual loop strap 1.

Figure 11:
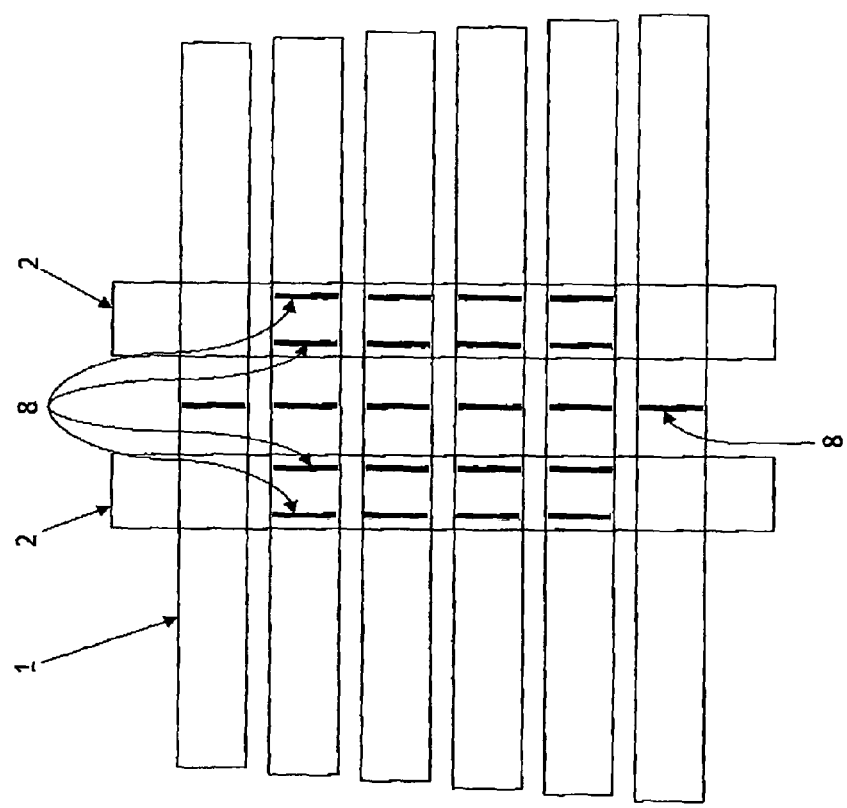

FIG. 11_moesof_seat_inner_strap_stitch_layout

Drawing showing of stitching location to attach inner straps 2 to MOESOF seat dual loop straps 1.

Figure 12:
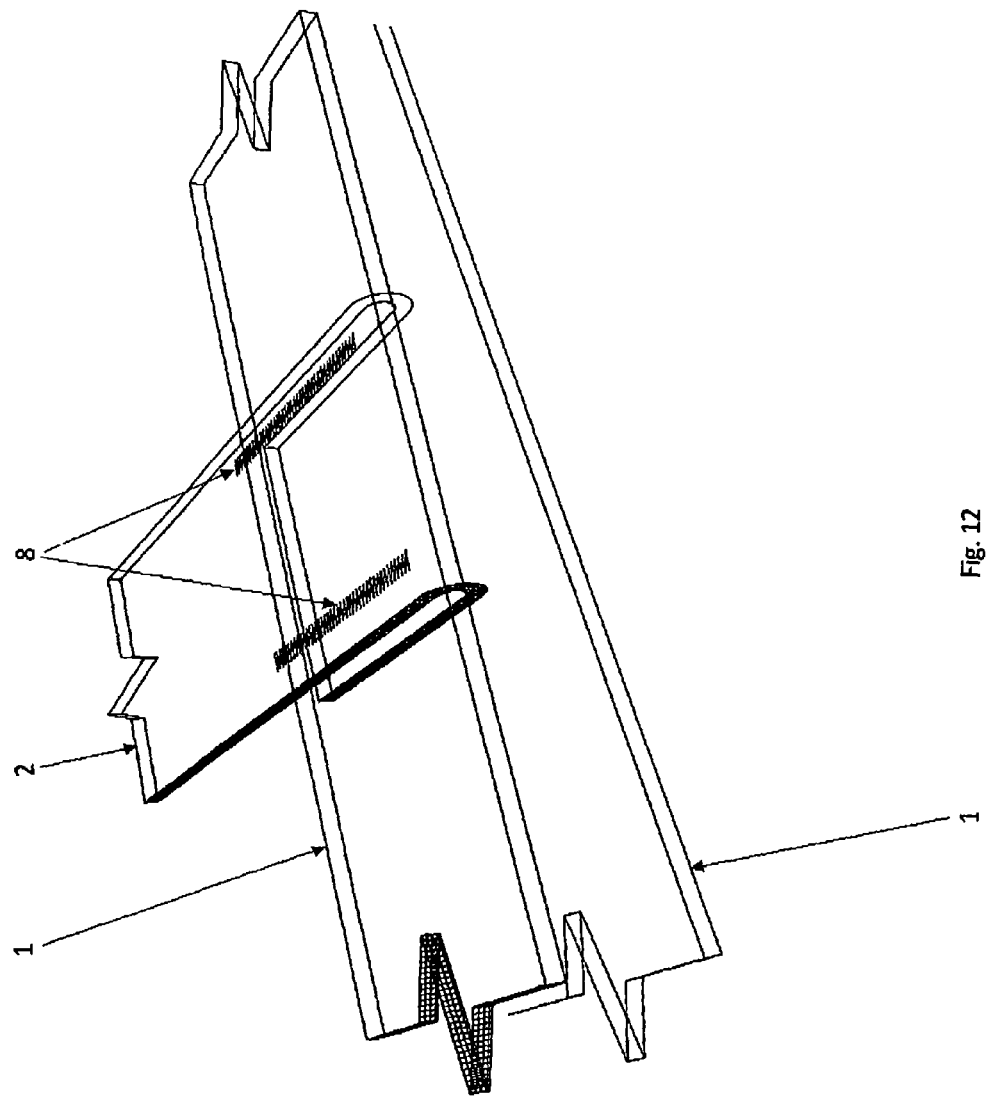

FIG. 12_moesof_seat_inner_strap_end

Detail drawing showing proper configuration and stitching of inner strap 2 ends. Note the inner strap 2 ends only attach to the top strap of the dual loop strap 1. Note they wrap around the top strap only of the dual loop strap 1 and are folded under the top strap of the dual loop strap 1 before they are attached 8. Note that the bottom strap of the dual loop strap 1 is not part of any stitching 8 this step.

Figure 13:
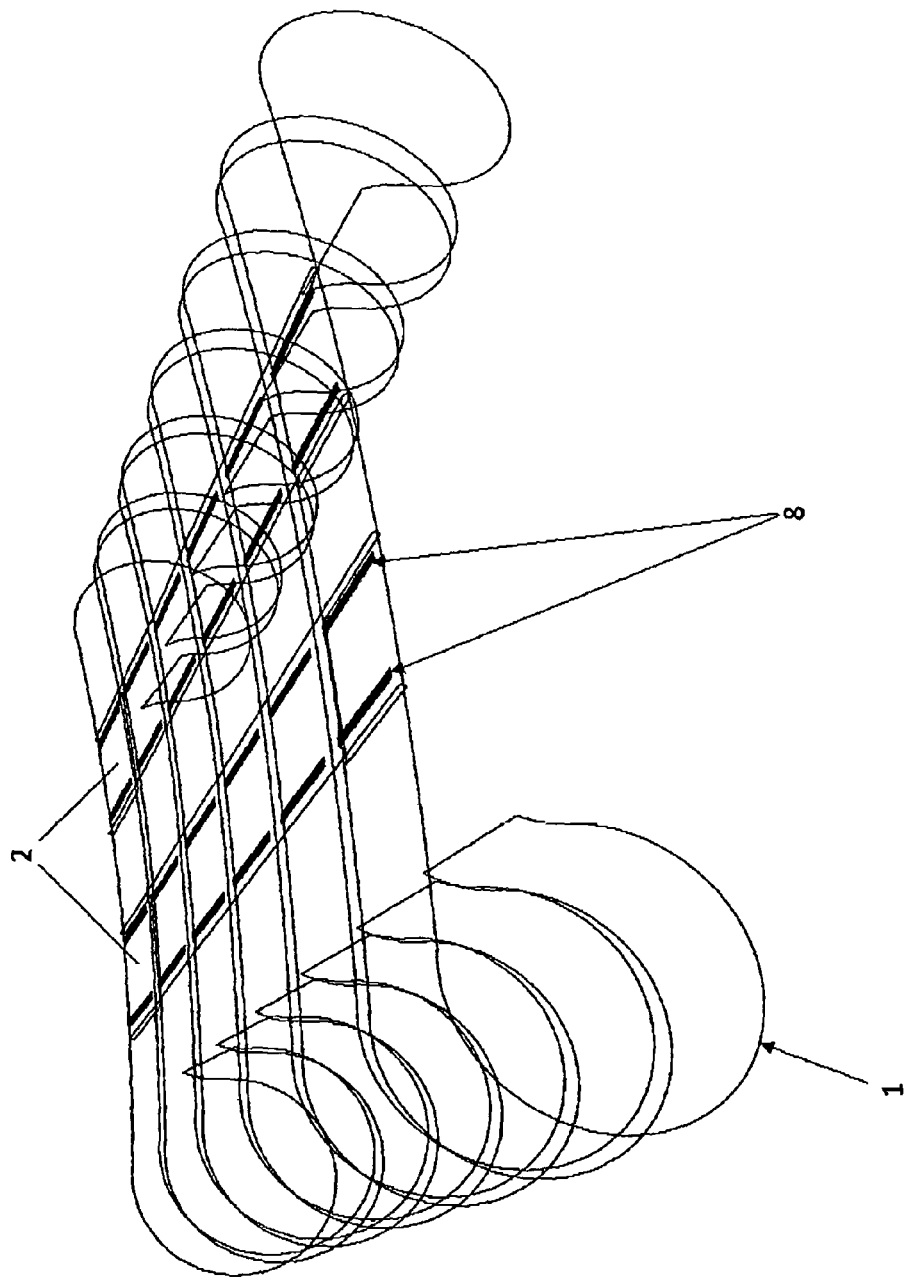

FIG. 13_moesof_seat_inner_strap_structure

Wireframe drawing of inner straps 2 properly attached 8 to all dual loop straps 1. Note the bottom center portion of each MOESOF seat dual loop strap is removed from this drawing to again emphasize the fact that the inner straps 2 are only attached to the top strap of the dual loop straps 1.

Figure 14:
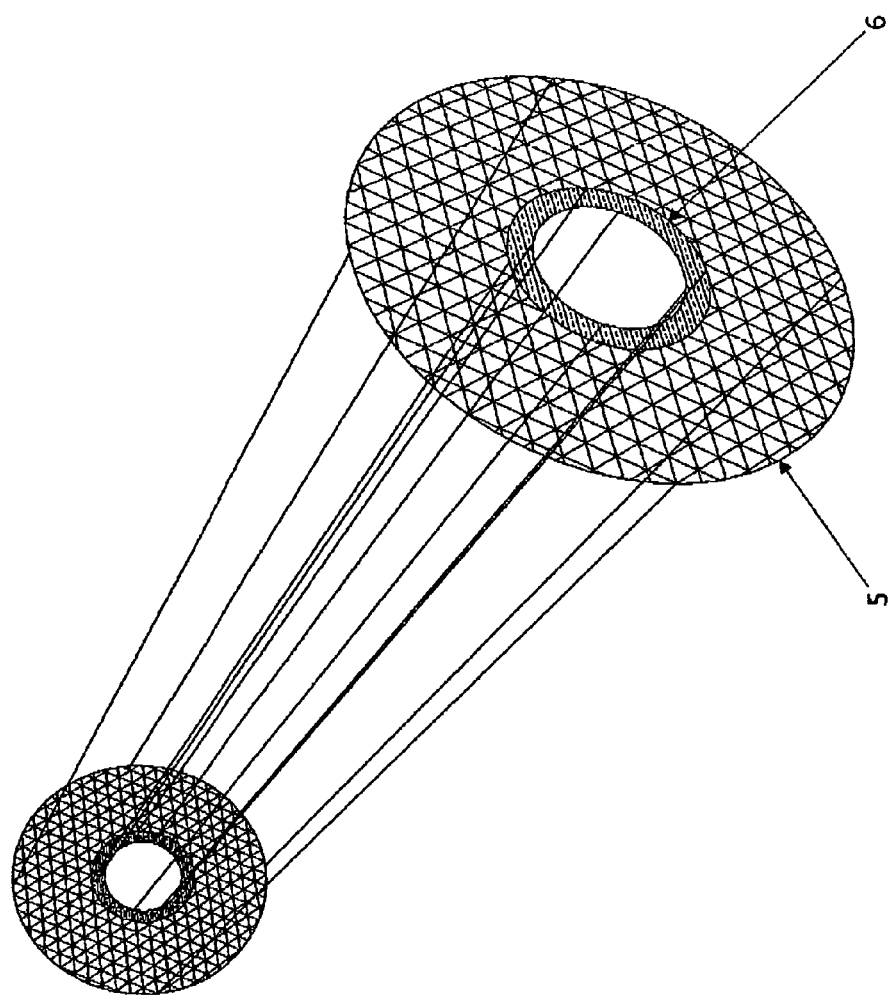

FIG. 14_moesof_seat_cylinder

Wireframe drawing illustrating the details of a single MOESOF seat structural foam component 5. Note the rigid tube 6 that runs the length of the foam component 5.

Figure 15:
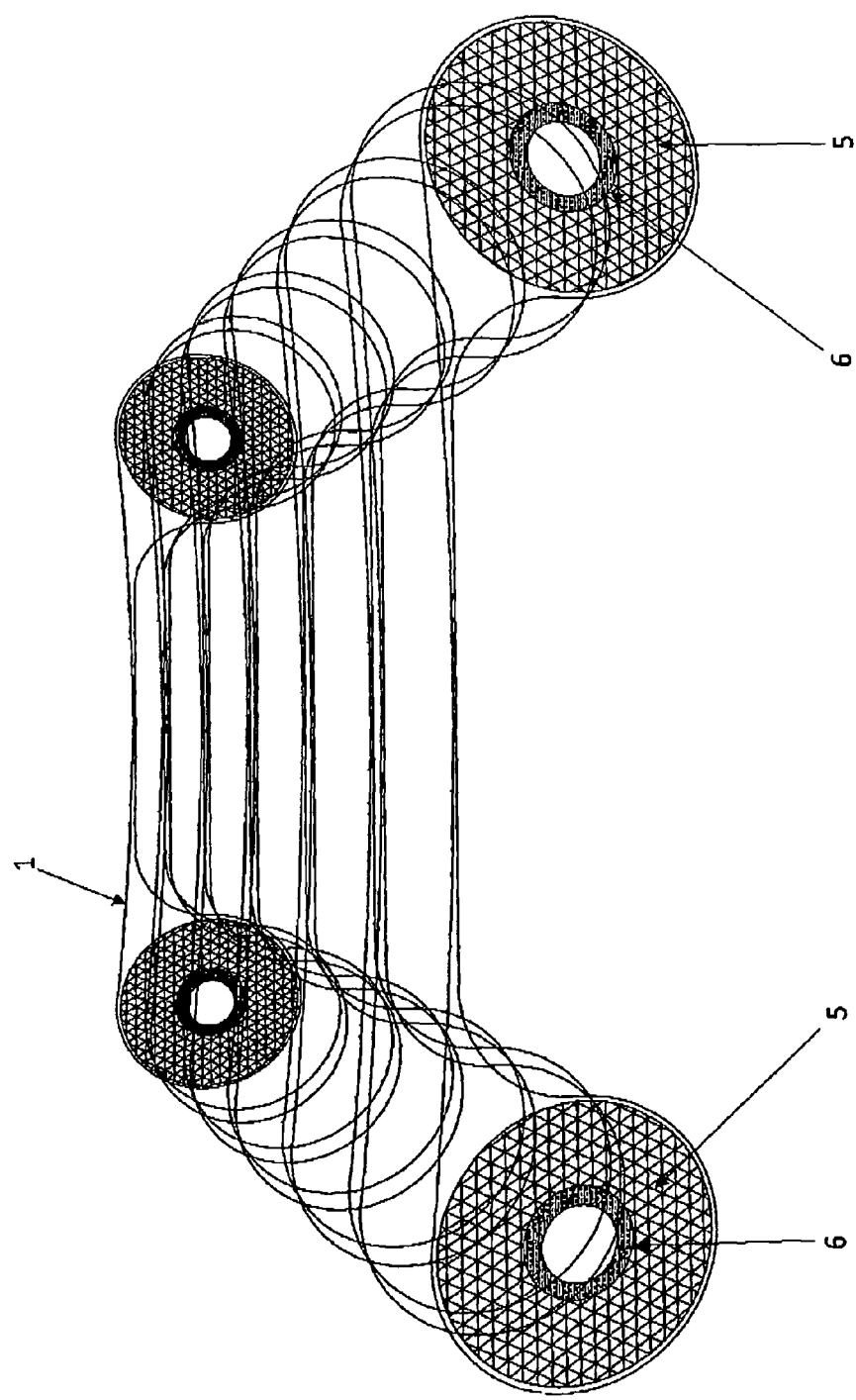

FIG. 15_moesof_seat_cylinder_dual_loop

Wireframe drawing illustrating the placement of the MOESOF seat structural foam components 5 and 6 captured by the MOESOF seat dual loop straps 1 as they would appear if the MOESOF seat frame was draped over a motorcycle seat.

Figure 16:
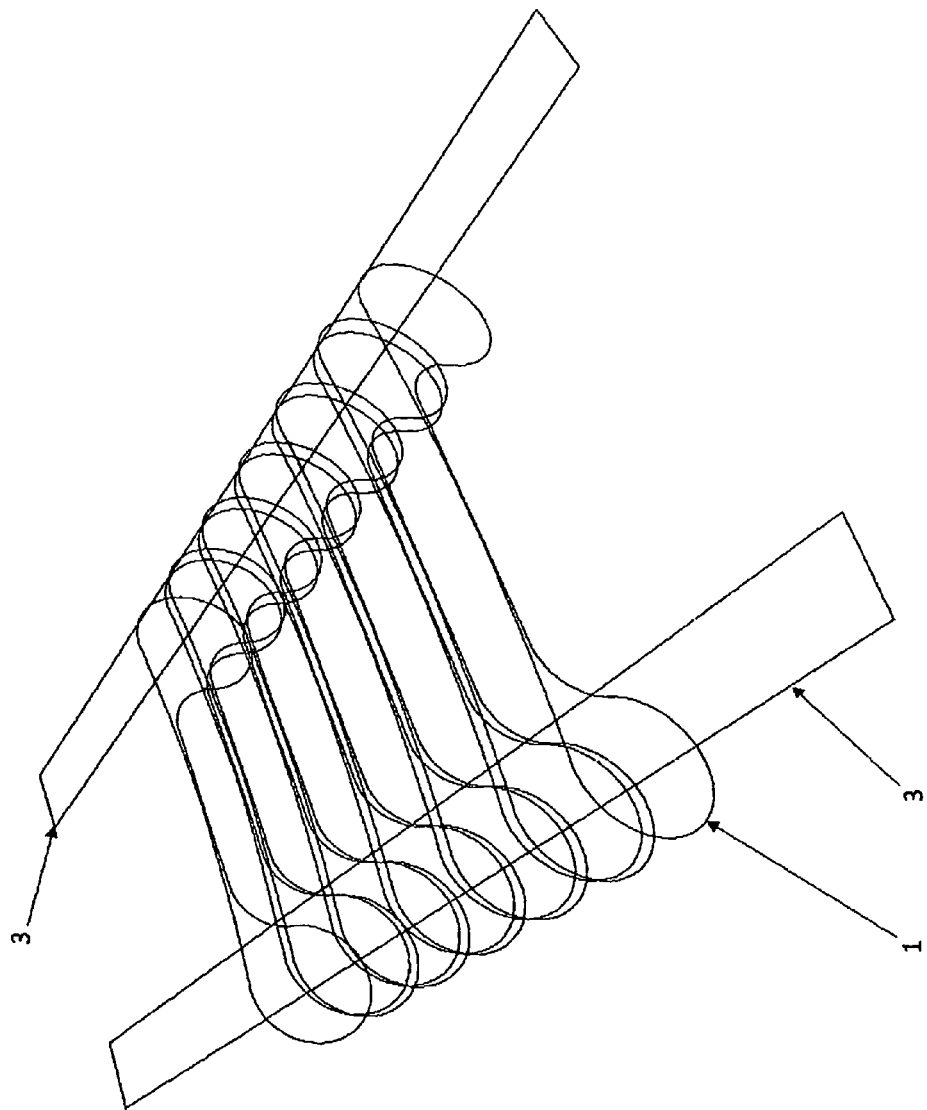

FIG. 16_moesof_seat_outer_strap_layout

Wireframe drawing illustrating the proper placement of the MOESOF seat's outer straps 3 over the MOESOF seat structure's dual loop straps if the MOESOF seat frame was draped over a motorcycle seat.

Figure 17:
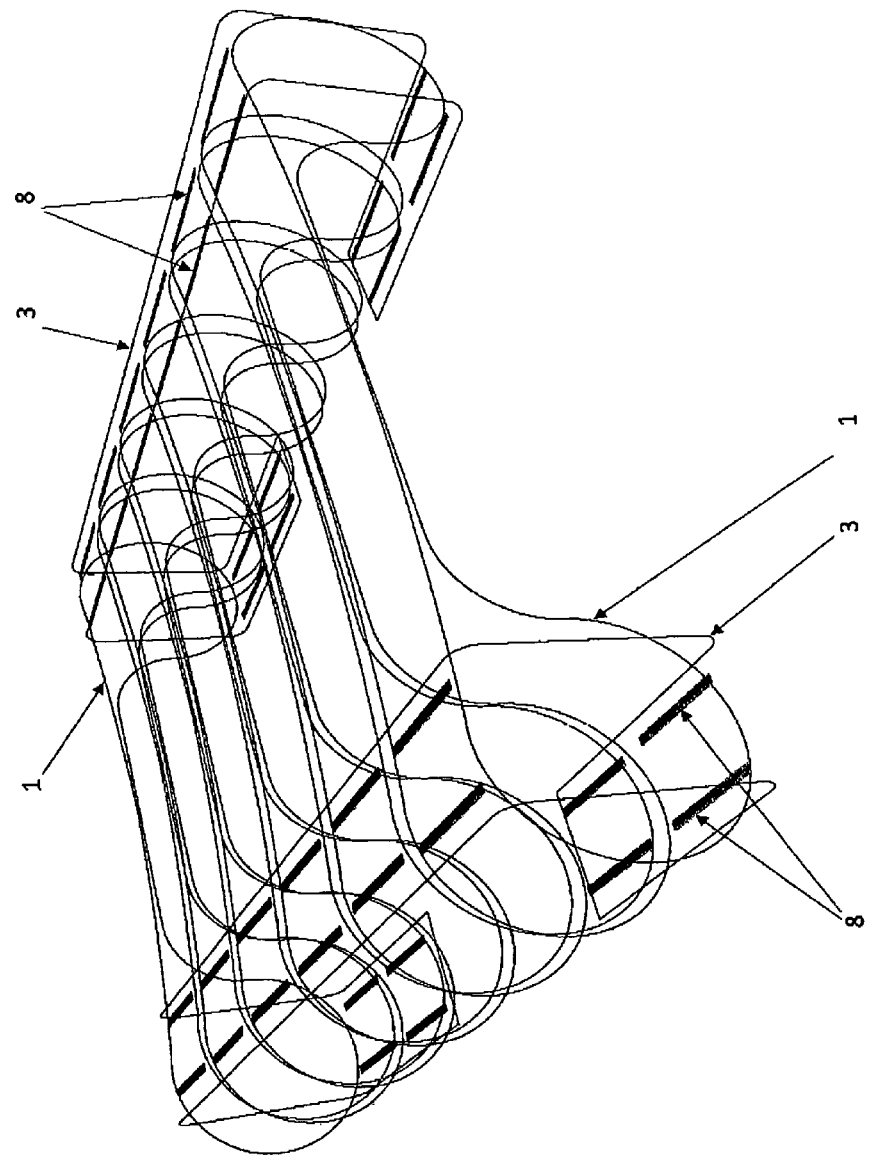

FIG. 17_moesof_seat_outer_strap_stitch

Wireframe drawing illustrating the proper placement of the stitches S to attach the MOESOF seat's outer straps 3 to MOESOF seat's dual loop structure if the MOESOF seat frame was draped over a motorcycle seat.

Figure 18:
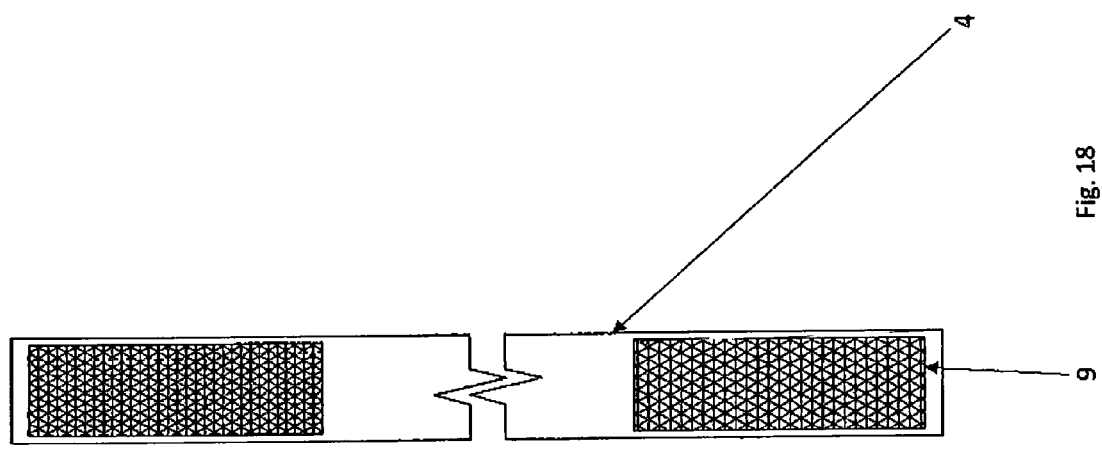

FIG. 18_moesof_seat_anchor_strap

Detail drawing of the MOESOF seat anchor strap 4. Hook and loop (Velcro) patch 9 attachment points at the ends of the MOESOF seat anchor strap 4 are shown.

Figure 19:
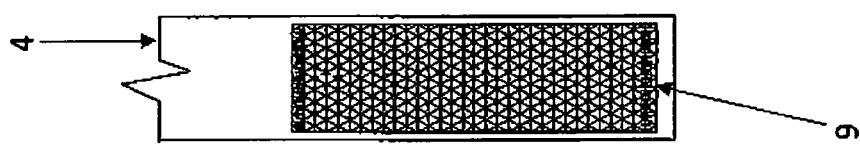

FIG. 19_moesof_seat_anchor_hook_loop

Detail drawing of the location to attach the softer "loop" material 9 (Velcro) to the MOESOF seat anchor strap.

Figure 20:
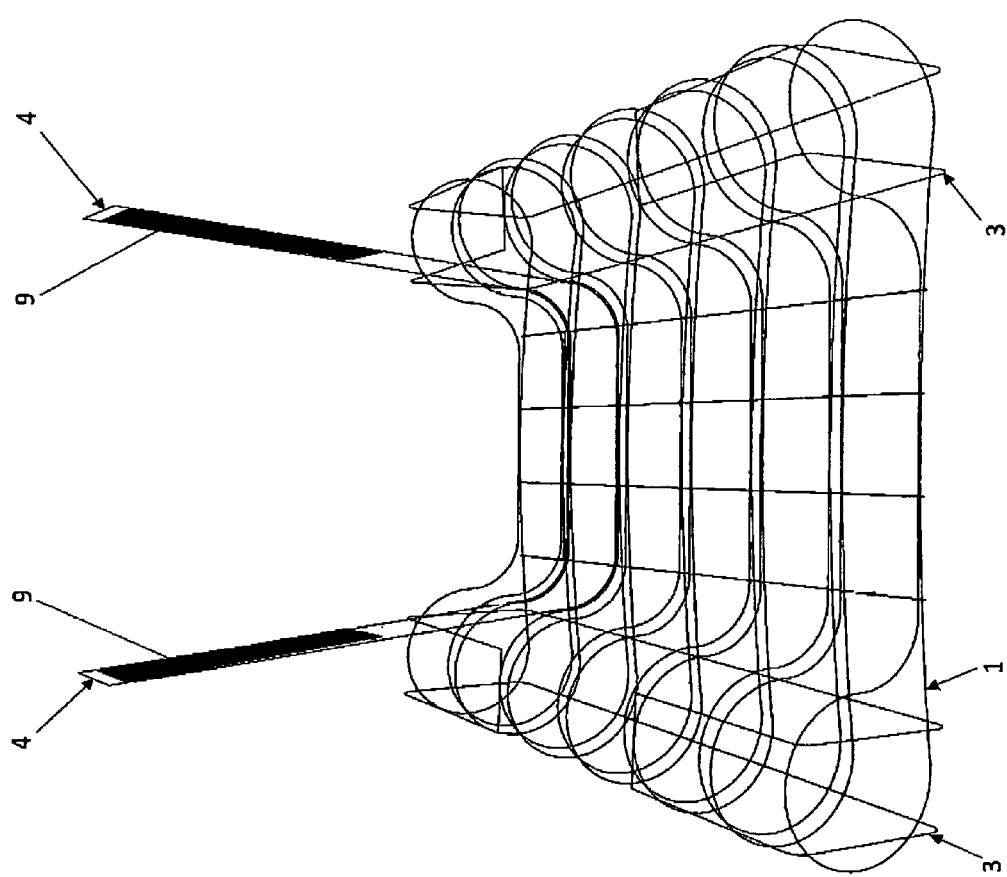

FIG. 20_moesof_seat_anchor_layout

Wireframe drawing illustrating the of the MOESOF seat anchor strap placement in the MOESOF seat load bearing structure. Note the illustration shows the MOESOF seat frame in an inverted position to better illustrate the attachment of the anchor strap.

Figure 21:
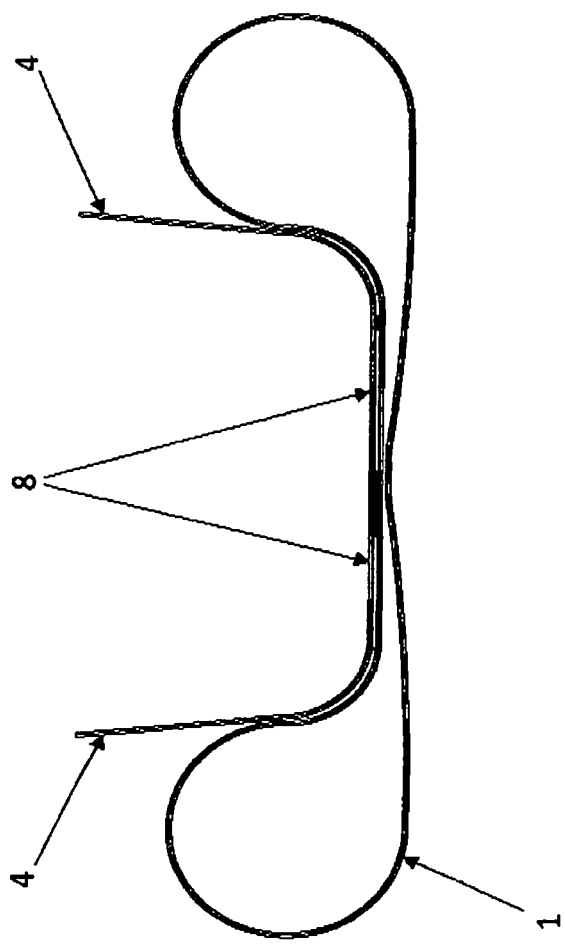

FIG. 21_moesof_seat_anchor_stitch_layout

Detail drawing of attachment configuration used to attach the MOESOF seat anchor strap 4 to dual loop strap 1. Note the drawing shows the MOESOF seat in an inverted position.

Figure 22:
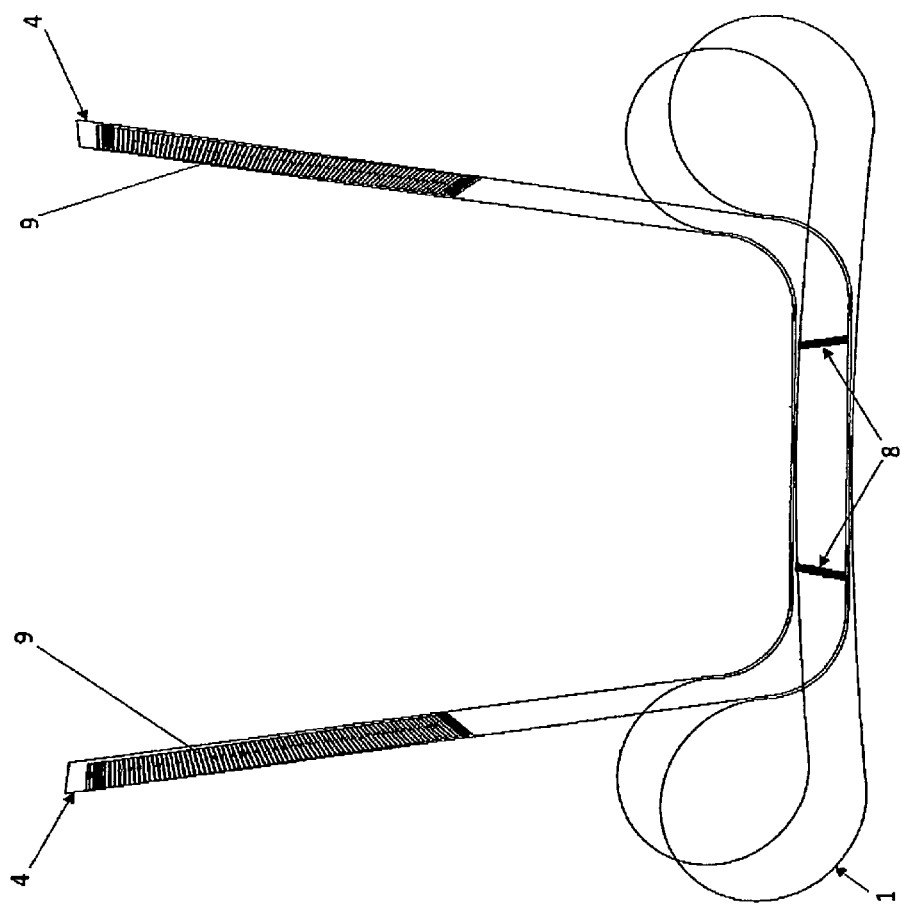

FIG. 22_moesof_seat_anchor_stitching

Wireframe drawing illustrating the proper stitching placement 8 used to attach the MOESOF anchor strap to the MOESOF seat dual loop straps 1. Note the drawing shows the dual loop strap and the anchor strap in an inverted position.

Figure 23:
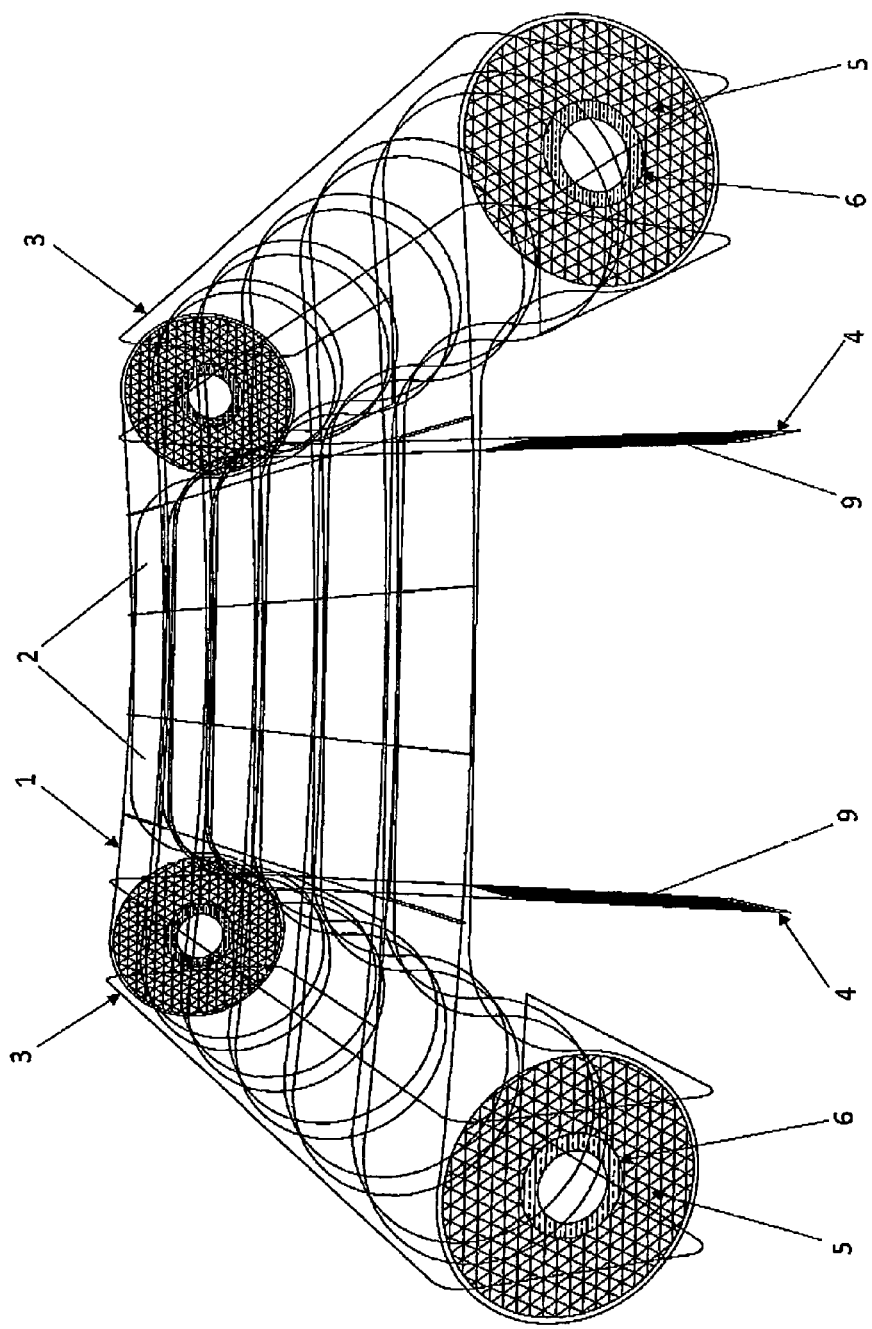

FIG. 23_moesof_seat_installed

Wireframe drawing illustrating the MOESOF seat frame with structural foam components 5 and 6 in place as it would appear when draped over an existing motorcycle seat. Note the perspective is from above and behind. Note all components are present in this view of a completed seat.

DETAILED DESCRIPTION—COMPONENTS

1. MOESOF Seat—Top layer

The top layer of the MOESOF seat is made up of four straps. A gap is maintained between these 4 straps and none of these 4 straps directly connect to each other. All four straps run down the length of the MOESOF seat front to back and all are on top of the loop straps. Two of them run on either side of the seat's center line. These are the MOESOF seat's inner straps 2 (FIG. 1C). Two additional straps run outside the inner straps. These are the MOESOF seat's outer straps 3 (FIG. 1D). The inner and outer straps tie the dual loops of the seat together and distribute nonvertical loads across the entire MOESOF seat structure. Because they run front to back, forward and rearward movement of a seated operator is eased as that movement is in line with the direction the straps.

Additionally, the outer straps 3 continue beyond the top surface of the MOESOF seat and wrap down around the ends and attach to the bottom of the leading and trailing MOESOF seat loops 1 (FIG. 17). This closes off the ends of the channel created by lining up the loop straps side by side to create a pocket on the left and right sides of the MOESOF seat. These pockets accept and hold the MOESOF structural foam components 5 and 6 (FIG. 23). In doing so the outer strap also provides a connection point between the top of the MOESOF seat and the bottom, enough to hold the structural foam components in place.

2. MOESOF Seat—Structural Foam Component

Two MOESOF structural foam components 5 and 6 (FIG. 15) are used in a single MOESOF seat. They are an assembly constructed of a lightweight rigid tube at their center surrounded by foam suitable for use in a seat 5 and 6 (FIG. 14). The structural foam components 5 and 6 (FIG. 15) are supported along their length by being installed inside the loops of the dual loop straps 1 (FIG. 15) and are contained there by the outer straps that wrap around their ends.

As an assembly, the seat foam remains suitable for sitting, while the rigid central core keeps the entire assembly bending along its length under load. Load applied to any one location of the foam component will deflect the entire component, which in turn will distribute the load across every loop in the MOESOF seat to support the load.

They also provide the additional volume of seat foam needed to widen the existing seat on a motorcycle.

In addition to supporting and disturbing vertical loads, the structural foam components also transfer the force applied to the front of the MOESOF seat as a rider's knees move from the front to the center of the bike as they transition from a seated to a standing position.

Because the foam components are rigid each deflects to the rear as a unit and carries with it the outer strap designed to contain it. Because the outer straps are attached to each dual loop strap in the seat, every dual loop strap becomes part of the distortion of the MOESOF seat frame needed to allow for the foam components movement. This movement is distributed across the entire MOESOF seat, expressed as deflections of each length of strap that runs between any two points on the seat where one strap is attached to another.

The additional foam components are placed lose inside the pockets created by the MOESOF seat loop straps and the outer strap and can float inside the MOESOF seat structure (FIG. 1F). When under the vertical load of a seated operator, the MOESOF structural foam components try to move away from the force but are held in place by the loop straps. This creates tension in the MOESOF seat straps which stiffens the entire assembly into useable seating area. In effect, they provide two additional small seats that are held in place alongside the existing motorcycle seat structure. The structural foam components float inside the dual loop straps;

there are no attachment points like stitching or adhesives between the MOESOF seats structural foam components and the loops and straps that contain them.

3. MOESOF Seat—Anchor Strap

The MOESOF seat anchor strap 4 (FIG. 1E) holds the installed MOESOF seat structure firmly in place on a motorcycle. The two ends of the anchor straps have hook and loop fastener material (like Velcro) stitched in place 9 (FIG. 19). The softer more flexible cloth like loop material is used on the ends of the straps, while the more rigid adhesive backed hook patches are stuck to the side covers of the motorcycle. This allows quick and secure installation/removal/adjustment of the MOESOF seat on a motorcycle.

The center of the MOSEOF seat anchor strap 4 (FIG. 21) attaches to the bottom of the MOESOF seat 4 (FIG. 20). This connection and its comparatively small attachment area 8 (FIG. 21), on either side of the center stitching and to the bottom only of a loop strap 1 (FIG. 21), allows the entire web like structure of the MOESOF seat above the anchor strap connection point 8 (FIG. 21) the ability to float and/or deflect in response to any operator contact that is other than the vertical downward force of a seated rider. This small anchor point provides a fixed point against which the rest of the non-anchored seat can exert force and flex out of the way, as when the seat is deflected and distorted by a standing rider. The tension stored in the non-anchored portion, of the seat when it was distorted causes the seat to return to its original position when the displacing force is removed.

4. MOESOF Seat—Middle Layer

The MOESOF seat's middle layer is made up straps sewn into loops that are arranged across the motorcycle's existing seat (FIG. 1B). Each loop is itself sewn together in the middle creating a dual loop structure 1 (FIG. 7). When installed the loops of the middle layer extend out past the sides of the existing motorcycle seat and are in contact with the both the top and the sides of the existing motorcycle seat 7 (FIG. 1 G). The loops of the middle layer of the MOESOF seat are primarily responsible for both load carrying and creating the MOESOF seat's built in flexibility, load carrying, and strong elastic deformation properties. Combined with the structural foam components, these loops increase the seating area under a seated rider.

The dual loops of the middle layer are never collapsed and never stitched to themselves except in the center. The loops are not directly attached to one another and they are only attached to the inner and outer straps of the MOESOF seat frame at measured intervals where the loops and straps cross each other at ninety or near ninety degree angles, and even then, only the loop's top strap or bottom strap is involved in any one attachment. This creates a grid pattern in the strap structure of the completed seat, creating many small lengths of free strap attached to nothing that run largely perpendicularly between connection points.

When placed over an existing motorcycle seat, the dual loops of the MOESOF seat's middle layer are responsible for absorbing and distributing all the compressive and tensile loads across the entire MOESOF seat structure as well as directing this load to the existing motorcycle seat in a new and unique way, not just from the top but now distributing the load to side of the existing seat well.

Under the weight of a seated rider, the loops that make up the MOESOF seat's middle layer experience tension, the MOESOF structural foam components are pushed downward by the weight of the rider but are held in place by the loops, creating compression in the foam components and tension in the dual loop straps that contain them. These two forces combine to clamp down on the existing seat from three sides (top, left, and right sides) and make rigid the entire MOESOF seat structure on the existing seat; the two forces balance each other out, and only exist at the rates needed to support a given load.

This middle layer is also designed to be flexible when not wider load. This is important to the performance of the MOESOF seat as it allows a standing rider to deflect the additional foam components out of the way as they move around on the bike. When this happens the "webbing" style of construction of the MOESOF seat allows an unloaded MOESOF seat to deflect at many points across its entire structure when force is applied by a standing rider. This "many points of deflection" feature, and the somewhat stiff characteristics inherent to nylon strap when short lengths of it are pushed out of their resting shape, provides the strong "memory" characteristic to the MOESOF seat.

When this happens the MOESOF seat does not bind or kink or twist. Rather every length of strap between connection points of the MOESOF seat deflects along its run through the webbing structure, allowing the MOESOF structural foam components to move rearward while maintaining positions largely parallel to each other. The straps of each of the dual loop straps deflect to absorb this movement. This movement is distributed across the entire MOESOF seat, expressed as deflections of each length of strap that runs between any two points on the seat where one strap is attached to another.

The MOESOF seat will deflect out of position to allow for unimpeded standing and will return to its original installed resting state the moment the force deflecting it is removed. The MOESOF seat will be in position in time to receive the operator as they return to a seated position, 5. Existing Motorcycle Seat Alone, an existing motorcycle seat compresses in a single manner, vertically between the load of a seated rider and the unyielding frame of the top of the machine. The top compressing in a single direction, downward, until enough seating material is deflected that its cumulative resistance to compression equals the force being applied.

Importantly, the loops of the MOESOF seat's middle layer hold the MOESOF structural foam components alongside the top of the existing motorcycle seat (FIG. 10). When installed, the dual loops of the middle layer travel roughly straight across the top of the existing seat left to right, wrap down and around the foam components and then up the side of the existing seat, and back over across the top of the existing seat. This configuration is mirrored on each side of the existing seat. This arrangement captures roughly the entire volume of the existing seat under the MOESOF seat, straps capturing the top of the seat, and straps holding additional seating foam along the sides of the existing seat.

The MOESOF seat structure adds additional material to both sides of the existing motorcycle seat, increasing its width. It wraps around the top and the sides of the existing seat. The center of the MOESOF seat is supported by the existing seat. The additional foam components have no support directly beneath them. As a rider sits on this wider platform, the unsupported foam components held by the dual loop straps want to roll inwards and fold around the supported center of the MOESOF seat. This roll inward towards the supported center is counteracted by the side of the existing seat (FIG. 2). By capturing and applying compressive loads flat against three sides of the existing seat the MOESOF seat creates the solid base needed to hold its shape under load and provide wider usable support to a rider.

DETAILED DESCRIPTION—CONSTRUCTION

1. MOESOF Seat—Overview

The MOESOF seat consists of five major components. These notes describe building each component and how to create each and assemble each to the next to create a single assembly that is the MOESOF seat structure.

The completed MOESOF seat structure is designed to be laid over the top of an existing motorcycle seat. It is held in place during use by anchor straps with hook and loop fasteners attached to the side covers of motorcycles or looped through a frame structure and pulled back around and fastened to itself. When in place on a motorcycle the MOESOF seat structure appears as it does in (FIG. 1A). Creating and using the MOESOF seat is covered here.
Components:
  MOESOF Dual Loop straps (FIG. 1B)
  MOESOF Inner straps (FIG. 1C)
  MOESOF Outer straps (FIG. 1D)
  MOESOF Anchor Strap with hook and loop fasteners (FIG. 1E)
  MOESOF Structural Foam Component (FIG. 1F)

2. MOESOF Seat—Cross Section

When in place on an existing motorcycle seat the completed MOESOF seat structure contacts the motorcycle as shown in (FIG. 2). Anchor straps not shown.

3. MOESOF Original Loop—Create

Cut lengths of strap. (FIG. 1) The measurements may vary across different motorcycle makes and models.

One at a time, sew each strap separately into a loop, overlapping the two ends of each strap by 1.5", as if the strap were being wrapped flat around an object with a circumference 1.5" less than the length of the strap. Join the strap into a loop by sewing only the ends together where they overlap each other by 1.5", forming a continuous loop. (FIG. 4)

4. MOESOF Dual Loop Straps—Create

One at a time, lay each loop out flat on a surface, collapsing each loop flat upon itself.

Create dual loop straps from each of the original loops by sewing across the loop at its center, joining the top and bottom of the single loop, creating a dual loop strap of two equal sized loops, Taken together the MOESOF seat dual loop straps form the middle layer of the MOESOF seat. When laid over an existing motorcycle seat they form the tension component of the MOESOF seat 1 (FIG. 2).

5. MOESOF Dual Loop Straps—Layout

Arrange the dual loop straps side by side. Make sure the 1.5" overlap stitching where the loop was originally joined together is down (touching the table), and the unbroken side is up.

Line up the center of each dual loop straps along a straight centerline, with 0.25" inch gap separating the side of one from the side of the next. (FIG. 8). These dual loop straps arranged like this form the middle structural load bearing layer of the MOESOF seat.

6. MOESOF Inner Strap—Layout

Cut two pieces of strap. Arrange each strap across the dual loop strap arrangement, largely perpendicular to the dual loop straps, largely parallel with the centerline down the center of the loop arrangement. (FIG. 9)

Offset each MOESOF seat inner strap a short distance of approximately 1 "from the dual loop centerline so that the nearest edge of the inner strap is approximately 1" from the center. Leave a tail at either end of each inner strap (FIG. 9). Each tail should be approximately 1.5".

7. MOESOF Inner Strap—Stitching

Each MOESOF inner strap must be attached to only the top strap of each MOESOF dual loop. The bottom strap of the dual loop needs to be kept away from the stitching used to join the inner straps to the top strap of the dual loop strap.

The MOESOF seat inner straps are stitched to dual loop straps at the points where the inner straps cross over the top strap of the dual loop straps (FIG. 10).

The MOESOF inner straps are attached differently to the first and last dual loop straps. Wrap the 1.5" tails of the inner straps under only the top strap of the first and last dual loop straps number 1 (front, FIG. 1 B) and dual loop number 6 (rear, FIG. 1 B), and sew into place to finish each end of the inner straps (FIG. 12). The result will be a structure as shown in FIG. 13. Note in FIG. 13 the central portion of the bottom strap of the dual loop straps are not illustrated to further emphasize that the MOESOF seat inner strap is attached only to the top strap of dual loop straps.

These are the MOESOF seat's inner straps and are part of the top layer of the MOESOF seat They tie the dual loop straps together and hold them in position while easing rider movement forward and backward across the dual loop straps while seated on the MOESOF seat, as that movement is in line with the direction of the inner straps. And they distribute any rearward horizontal forces that may be applied to the front of the seat by a standing rider to all 6 of the dual loop straps that make up the MOESOF seat frame, distorting each in an organized way, avoiding kinking or binding at any one location.

8. MOESOF Structural Foam Component—Create

Cut two lengths of rigid structural tube or rod. Cut two lengths of foam material suitable for use in a seat that has an interior diameter hole running the length of its center. Insert rigid structural tube or rod into center of foam material to create MOESOF structural foam component creating a structural foam component. (FIG. 14)

9. MOESOF Outer Straps—Create

Cut two pieces of strap long enough to wrap around the foam components from end to end, top to bottom. These are the MOESOF outer straps.

8. MOESOF Structural Foam Component—Create

Cut two lengths rigid structural tube or rod. Cut two lengths of foam material suitable for use in a seat that has an interior diameter hole running the length of its center. Insert rigid structural tube or rod into center of foam material to create MOESOF structural foam component. (FIG. 14)

9. MOESOF Outer Straps—Create

Cut two pieces of strap long enough to wrap around the foam components from end to end, top to bottom. These are the MOESOF outer straps.

10. MOESOF Outer Straps—Layout

Take the MOESOF seat structure as it is currently assembled and center the outer straps so the tails of extra length are even, outside of and largely parallel with the inner straps, and over the area of that will be occupied by the foam components (FIG. 16)

11. MOESOF Outer Straps—Stitching

Wrap the outer strap tails around the end of each foam components and fix in place.

These are the MOESOF seat's outer straps and are part of the top layer of the MOESOF seat. They tie the dual loop straps together and hold them in position while easing rider movement forward and backward across the dual loop straps while seated on the MOESOF seat, as that movement is in line with the direction of the outer straps. They form the ends of the pockets created by the dual loop straps, and they distribute any rearward horizontal forces that may be applied to the front of the seat by a standing rider to all 6 of the dual loop straps that make up the MOESOF seat frame, distorting each in an organized way, avoiding kinking or binding at any one location.

12. MOESOF Anchor Straps—Create

Cut a single length of strap and lay it flat. Cut two pieces of loop material (of hook and loop material like Velcro). Place patches of loop material, one at each end of the MOESOF anchor strap, both on the same side of the strap, and both in line with the strap with loops up. (FIG. 18) Sew the loop patches in place. (FIG. 19)

13. MOESOF Anchor Straps—Layout

Flip the MOESOF seat over so the inner and outer straps are down, and bottom of the dual loop straps are up.

Position the MOESOF anchor strap on top of, parallel to, and in line with, and centered over the bottom of the MOESOF seat with the patches of loop material facing up. (FIG. 20)

14. MOESOF Anchor Straps—Stitching

When stitching the MOESOF anchor strap in place, stitch only to that part of the bottom strap of dual loop strap that is in immediate contact with the anchor strap (FIG. 21). It is important the area of the MOESOF seat connected to the anchor strap be small relative to the total area of the MOESOF seat 8 (FIG. 21) and that the anchor strap only be attached to the bottom layer of the MOESF seat 8 (FIG. 22). This secures the seat to one location on the bike but leaves most of the seat free to articulate when not under load.

Locate these stitches on either side of center and stitch, fixing the anchor strap to the bottom of the MOESOF seat. This will complete the anchor strap used to hold the MOESOF seat in place on the motorcycle, and create the bottom layer of the MOESOF seat assembly.

15. MOESOF Seat—Assembly

Insert the structural foam components into the loops on each side of the of the MOESOF seat. Pull each away from the center of the MOESOF seat towards the edges of the seat until they are supported by the pockets created at the ends of the loops.

16. MOESOF Seat—Installing

Make sure the existing seat and side panels of the motorcycle are clean and free of dirt or oil. With the motorcycle tamed off and leaning on its side stand or otherwise secured upright, sit on the bike, feet on the pegs, and locate yourself on the seat where you would sit if you were relaxed and traveling on the bike for some minutes. Mark the seat at the furthest rearward spot your pants contact the seat. This will be the reference point used to position the rear of the MOESOF seat.

Place the completed MOESOF seat on top of an existing motorcycle seat with the rear of the MOESOF seat just covering the reference point applied in the previous step to the motorcycle seat. This is a good starting point for the initial install of the MOESOF seat.

The MOESOF seat will conform to the motorcycle seat and assume a configuration as shown in FIG. 23. Pull the anchor straps straight down at an angle perpendicular to the surface of the existing motorcycle seat. Adjust the ends the strap so the MOESOF seats foam components are at even heights relative to the top surface of the existing seat. Pull ends of the straps down snug against the top of the existing seat and bring them in towards the side panels of the motorcycle and us the hook and loop fasteners to secure the MOESOF seat to the motorcycle 17. MOBS Seat—Using Simply install the seat as described in this document and ride. The MOESOF seat does not add to the overall seat height of the bike. The MOESOF seat adds all these features to an existing bike without any real modifications to the bike. The MOESOF seat is compact and can be installed or removed in seconds allowing riders to change their seating throughout the day.

The invention claimed is:

1. An add-on motorcycle seat saddle comprising:
two foam components, each with a rigid tube or rod running along a length of the foam component to resist bending; a plurality of substantially parallel flexible dual loop straps extending between the
two foam components, wherein each dual loop strap is formed by a top strap portion and a bottom strap portion stitched together to form two loops wherein one of the two loops wraps around one of the two foam components and the other of the two loops wraps around the other of the two foam components; a plurality of inner and outer straps extending substantially perpendicular to the plurality of substantially parallel flexible dual loop straps wherein each of the plurality of inner straps and outer straps is attached to each of the plurality of substantially parallel flexible dual loop straps;
at least one anchor strap extending substantially parallel to the plurality of substantially parallel flexible dual loop straps and extending downward below the plurality of substantially parallel flexible dual loop straps, wherein the at least one anchor strap is attached to the plurality of substantially parallel flexible dual loop straps between the two foam components; wherein the add-on motorcycle seat saddle is configured to be placed over an existing motorcycle seat and secured thereto by the at least one anchor strap such that the two foam components are configured to be positioned outward of the existing motorcycle seat and the plurality of substantially parallel flexible thud loop straps and plurality of inner and outer straps are positioned above the existing motorcycle seat wherein when a seat occupant sits upon the add-on motorcycle seat saddle the two foam components roll inward and clamp down around sides of the existing motorcycle seat, tensioning the plurality of substantially parallel flexible dual loop straps to form a seating area that is larger than a seating area provided by the existing motorcycle seat.

2. The add-on motorcycle seat saddle of claim 1, wherein the plurality of substantially parallel flexible dual loop straps and the plurality of inner and outer straps distort under an external load by a seat occupant and return to an original unloaded state upon removal of said external load.

* * * * *